United States Patent
Yamamoto

(10) Patent No.: US 6,792,821 B1
(45) Date of Patent: Sep. 21, 2004

(54) SHIFTING DEVICE FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/216,721

(22) Filed: Aug. 13, 2002

(30) Foreign Application Priority Data

Aug. 21, 2001 (JP) ........................................ 2001-249918

(51) Int. Cl.⁷ .................... F16H 59/00; F16H 61/00; F16H 63/00; B62K 25/00; H01F 3/00; H01F 7/08
(52) U.S. Cl. .................. 74/335; 74/473.12; 335/256
(58) Field of Search .................... 74/335, 333, 334, 74/339, 473.12; 335/220, 229–230, 256, 266, 268

(56) References Cited

U.S. PATENT DOCUMENTS

| | | | | |
|---|---|---|---|---|
| 5,199,313 A | * | 4/1993 | Muller | 74/335 |
| 5,205,179 A | * | 4/1993 | Schneider | 74/365 |
| 5,222,404 A | | 6/1993 | Stine | |
| 5,689,997 A | * | 11/1997 | Schaller | 74/335 |
| 5,743,143 A | * | 4/1998 | Carpenter et al. | 74/335 |
| 5,911,787 A | * | 6/1999 | Walker | 74/335 |
| 5,992,254 A | * | 11/1999 | Machado | 74/335 |
| 6,065,363 A | | 5/2000 | Schaller et al. | |
| 6,145,398 A | | 11/2000 | Bansbach et al. | |
| 6,182,522 B1 | * | 2/2001 | Tartivita | 74/333 |
| 6,427,548 B1 | | 8/2002 | Leimbach et al. | |
| 6,497,160 B2 | * | 12/2002 | Meyer et al. | 74/335 |
| 2002/0096008 A1 | * | 7/2002 | Yamaoto | |
| 2003/0061891 A1 | * | 4/2003 | Yamamoto et al. | 74/335 |

FOREIGN PATENT DOCUMENTS

| | | |
|---|---|---|
| DE | 198 44 472 | 6/1999 |
| DE | 199 12 817 | 8/2000 |

* cited by examiner

Primary Examiner—Tisha Lewis
(74) Attorney, Agent, or Firm—James N. Dresser, Esq.

(57) ABSTRACT

A shifting device for operating the shift lever of a transmission equipped with a synchronizing mechanism in the direction of shift, which comprises a shift actuator for operating the shift lever in the direction of shift, a shift stroke sensor for detecting the shift stroke position of said shift lever, and a control means for controlling the electric power fed to said shift actuator based on a signal from said shift stroke sensor. The control means controls the electric power fed to the shift actuator in response to the shift stroke position detected by the shift stroke sensor.

4 Claims, 16 Drawing Sheets

SHIFTING DEVICE FOR A TRANSMISSION

FIELD OF THE INVENTION

The present invention relates to a transmission mounted on a vehicle and, more specifically, to a shifting device for a transmission equipped with a synchronizing mechanism.

DESCRIPTION OF THE RELATED ART

The operation for shifting a transmission equipped with a synchronizing mechanism is such that a clutch sleeve is actuated in a state where a friction clutch arranged between the transmission and the engine is disconnected, a synchronizer ring is pushed so that the rotational speed of the output shaft, i.e., of the clutch sleeve is brought into synchronism with the rotational speed of a speed change gear that is to be brought into engagement and, then, the clutch sleeve is brought into engagement with dog teeth of the speed change gear. The synchronizing mechanism in the transmission is such that in the synchronizing operation, the chamfer of the synchronizer ring is brought into engagement with the chamfer of the spline of the clutch sleeve and after the synchronism has been established, the synchronizer ring is pushed back by the thrust of the clutch sleeve and is brought into engagement with the dog teeth. That is, in shifting the transmission equipped with the synchronizing mechanism, the largest thrust is required in the synchronizing operation at the time when the gear is to be engaged, and the next largest thrust is required for bringing the chamfer of the dog teeth into engagement with the chamfer of the spline of the clutch sleeve. When the gear is to be disengaged, on the other hand, a thrust is required during from the start of the operation for disengaging the gear until the dog teeth are out of mesh with the spline of the clutch sleeve. Therefore, the shifting operation can be executed with the largest energy efficiency if the shift actuator that operates the shift lever of the transmission equipped with the synchronizing mechanism in the direction of shift can produce a thrust corresponding to the shift stroke position.

Meanwhile, as a shift actuator for actuating the shift lever for operating the clutch sleeve, there has been used a fluid pressure cylinder using a fluid pressure such as pneumatic pressure or hydraulic pressure as a source of operation. In recent years, further, there has been proposed an actuator of the type of an electric motor as a shift actuator for a transmission mounted on a vehicle which is provided with neither a source of compressed air nor a source of hydraulic pressure.

In the conventional shifting device for the transmission, the shift actuator has been operated with a constant thrust over the whole shift stroke either when the gear is to be engaged or is to be disengaged. When the thrust of the shift actuator is small, therefore, an extended period of time is required particularly for the synchronizing operation and, hence, execution of the shifting operation requires an extended period of time. When the thrust of the shift actuator is increased, on the other hand, a large shock occurs at the time of engaging the gears and, besides, energy is consumed wastefully.

SUMMARY OF THE INVENTION

It is, therefore, an object of the present invention to provide a shifting device for a transmission capable of effecting the shifting operation with the highest energy efficiency by letting the shift actuator to produce a thrust corresponding to the shift stroke position to operate the shift lever of the transmission equipped with the synchronizing mechanism in the direction of shift.

In order to accomplish the above-mentioned object according to the present invention, there is provided a shifting device for operating the shift lever of a transmission equipped with a synchronizing mechanism in the direction of shift to bring the gear into engagement or disengagement, comprising:

a shift actuator comprising an operation rod that is engaged with an operation member coupled to said shift lever, a magnetic moving member arranged on the outer peripheral surface of said operation rod, a cylindrical fixed yoke arranged surrounding said magnetic moving member, and a pair of coils arranged side by side in the axial direction inside said fixed yoke;

a shift stroke sensor for detecting the shift stroke position of said shift lever; and a control means for controlling the electric power supplied to said pair of coils of said shift actuator based on a signal from said shift stroke sensor; wherein said control means controls the electric power fed to said pair of coils of said shift actuator in response to the shift stroke position detected by said shift stroke sensor.

The control means, in the gear-engaging operation, sets the electric power fed to said pair of coils to the first electric power up to a position where the synchronism of said synchronizing mechanism ends, and sets the electric power to the second electric power smaller than said first electric power after the synchronism end position is passed until a position where the engagement between the chamfer of a clutch sleeve of the synchronizing mechanism and the chamfer of the dog teeth ends.

Further, the control means, in the gear-disengaging operation, sets the electric power fed to said pair of coils to the third electric power smaller than said second electric power over a range in which the clutch sleeve of said synchronizing mechanism is in mesh with the dog teeth.

According to the present invention, further, there is provided a shifting device for operating the shift lever of a transmission equipped with a synchronizing mechanism in the direction of shift, comprising:

a shift actuator comprising the first electromagnetic solenoid and the second electromagnetic solenoid for operating the operation member coupled to said shift lever in the directions opposite to each other;

a shift stroke sensor for detecting the shift stroke position of said shift lever; and a control means for controlling the electric power fed to said first electromagnetic solenoid and to said second electromagnetic solenoid of said shift actuator based on a signal from said shift stroke sensor; wherein said control means controls the electric power fed to said first electromagnetic solenoid and to said second electromagnetic solenoid of said shift actuator in response to the shift stroke position detected by said shift stroke sensor.

The electric power fed to said first electromagnetic solenoid and to said second electromagnetic solenoid is set based on a target thrust corresponding to the shift stroke position and on a gap between the moving iron core and the fixed iron core of the first electromagnetic solenoid and of the second electromagnetic solenoid corresponding to the shift stroke position.

DETAILED DESCRIPTION OF THE PREFERRED EMBODIMENTS

A preferred embodiment of a shifting device for a transmission constituted according to the present invention will now be described in further detail with reference to the accompanying drawings.

Figure 1:
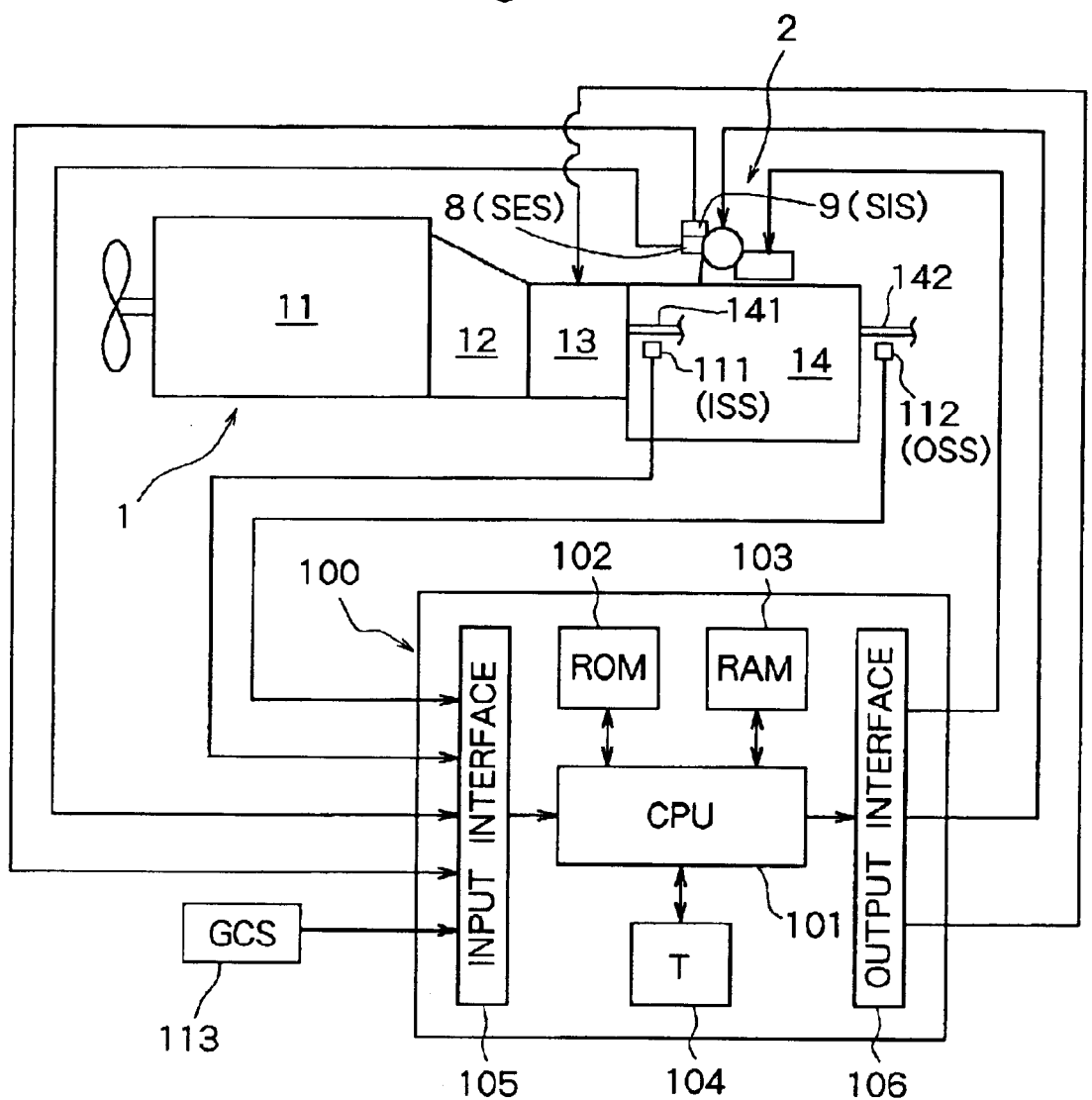
FIG. 1 is a block diagram schematically illustrating the constitution of a drive unit for a vehicle equipped with a shifting device for a transmission constituted according to the present invention.

FIG. 1 is a block diagram schematically illustrating the constitution of a drive unit for a vehicle equipped with a shifting device for a transmission according to the present invention. The illustrated drive unit 1 for a vehicle comprises a diesel engine 11 which is a prime mover, a fluid joint (fluid coupling) 12, a wet-type multi-plate clutch 13 (CLT) as a friction clutch and a transmission 14, which are arranged in series.

The transmission 14 is equipped with a synchronizing mechanism and is operated by a gear change device 2 to change the speed. The gear change device 2 will now be described with reference to FIGS. 2 to 8.

The gear change device 2 according to the illustrated embodiment comprises a select actuator 3 and a shift actuator that constitutes the shifting device. The select actuator 3 comprises three casings 31a, 31b and 31c formed in a cylindrical shape. A control shaft 32 is arranged within the three casings 31a, 31b and 31c, and is rotatably supported at its both ends by the casings 31a and 31c of both sides via bearings 33a and 33b. A spline 321 is formed in the intermediate portion of the control shaft 32. To this spline portion 321 is spline-fitted a cylindrical shift sleeve 35 that is formed integratedly with a shift lever 34, so as to be allowed to slide in the axial direction. The shift lever 34 and the shift sleeve 35 are made of a nonmagnetic material such as a stainless steel, the shift lever 34 being arranged passing through an opening 311b formed in the lower portion of the central casing 31b. An end portion of the shift lever 34 is so constituted as to come into suitable engagement with shift blocks 301, 302, 303 and 304 that constitute a shifting mechanism for operating the synchronizing mechanism in the transmission 14 and that are arranged at the first select position SP1 (first gear—reverse gear select position), at the second select position SP2 (third gear—second gear select position), at the third select position SP3 (fifth gear fourth gear select position) and at the fourth select position SP4 (sixth gear select position).

A magnetic moving member 36 is arranged on the outer peripheral surface of the shift sleeve 35. The magnetic moving member 36 is constituted by an annular permanent magnet 361 mounted on the outer peripheral surface of the shift sleeve 35 and having magnetic poles on both end surfaces thereof in the axial direction, and a pair of moving yokes 362 and 363 arranged on the outer sides of the permanent magnet 361 in the axial direction. The permanent magnet 361 in the illustrated embodiment is magnetized into the N-pole on the right end surface in FIGS. 2 and 3, and is magnetized into the S-pole on the left end surface in FIGS. 2 and 3. The pair of moving yokes 362 and 363 is made of a magnetic material and is formed in an annular shape. The thus constituted magnetic moving member 36 is limited from moving in the axial direction with its right end in FIGS. 2 and 3 of one moving yoke 362 (right side in FIGS. 2 and 3) being positioned by a stepped portion 351 formed in the shift sleeve 35, and with its left end in FIGS. 2 and 3 of the other moving yoke 363 (left side in FIGS. 2 and 3) being positioned by a snap ring 37 fitted to the shift sleeve 35. A fixed yoke 39 is arranged on the outer peripheral side of the magnetic moving member 36 surrounding the magnetic moving member 36. The fixed yoke 39 is made of a magnetic material, is formed in a cylindrical shape, and is mounted to the inner peripheral surface of the central casing 31b. A pair of coils 40 (MC1) and 41 (MC2) is arranged on the inside of the fixed yoke 39. The pair of coils 40 (MC1) and 41 (MC2) is wound on a bobbin 42 that is formed of a nonmagnetic material such as a synthetic resin or the like and is fitted to the inner peripheral surface of the fixed yoke 39. The pair of coils 40 (MC1) and 41 (MC2) is connected to a power source circuit that is not shown, and the electric power fed thereto is controlled by a control means 100 that will be described later. The length of the pair of coils 40 (MC1) and 41 (MC2) in the axial direction is set to be nearly corresponded to the length of selection from the first select position SP1 up to the fourth select position SP4. End walls 43 and 44 are each mounted on both sides of the fixed yoke 39. Sealing members 45 and 46 are fitted to the inner peripheries of the end walls 43 and 44 so as to come in contact with the outer peripheral surfaces of the shift sleeve 35.

The select actuator 3 is constituted as described above and works based on the principle of a linear motor constituted by the magnetic moving member 36 arranged on the shift sleeve 35, fixed yoke 39 and the pair of coils 40 and 41. The operation will now be described with reference to FIG. 4.

In the select actuator 3 of the illustrated embodiment, as shown in FIGS. 4(a) and 4(b), there is established a magnetic circuit 368 passing through the N-pole of the permanent magnet 361, one moving yoke 362, one coil 40 (MC1), fixed yoke 39, the other coil 41 (MC2), the other moving yoke 363 and S-pole of the permanent magnet 361. In this state, when electric currents are fed to the pair of coils 40 (MC1) and 41 (MC2) in the directions opposite each other as shown in FIG. 4(a), a rightward thrust is produced by the permanent magnet 361 or the shift sleeve 35 as indicated by an arrow in FIG. 4(a) according to the Fleming's left-hand rule. On the other hand, when the electric currents are fed to the pair of coils 40 (MC1) and 41 (MC2) in the opposite direction (opposite to the directions of FIG. 4(a)) as shown in FIG. 4(b), a leftward thrust is produced by the permanent magnet 361 or the shift sleeve 35 as indicated by an arrow in FIG. 4(b) according to the Fleming's left-hand rule. The magnitude of thrust produced by the permanent magnet 361, i.e., the shift sleeve 35 is determined by the amount of electric power fed to the pair of coils 40 (MC1) and 41 (MC2).

The select actuator 3 of the illustrated embodiment has the first select position-limiting means 47 and the second select position-limiting means 48 for limiting the position of the shift lever 34 to the first select position SP1, to the second select position SP2, to the third select position SP3 or to the fourth select position SP4 in cooperation with the magnitude of thrust acting on the permanent magnet 361 or on the shift sleeve 35. The first select position-limiting means 47 comprises snap rings 471 and 472 mounted on the central casing 31b at the right end portion in FIGS. 2 and 3 at a predetermined gap, a compression coil spring 473 arranged between the snap rings 471 and 472, a moving ring 474 arranged between the compression coil spring 473 and one snap ring 471, and a stopper 475 which limits the motion of the moving ring 474 when the moving ring 474 has moved toward the right by a predetermined amount in FIGS. 2 and 3.

Figure 2:
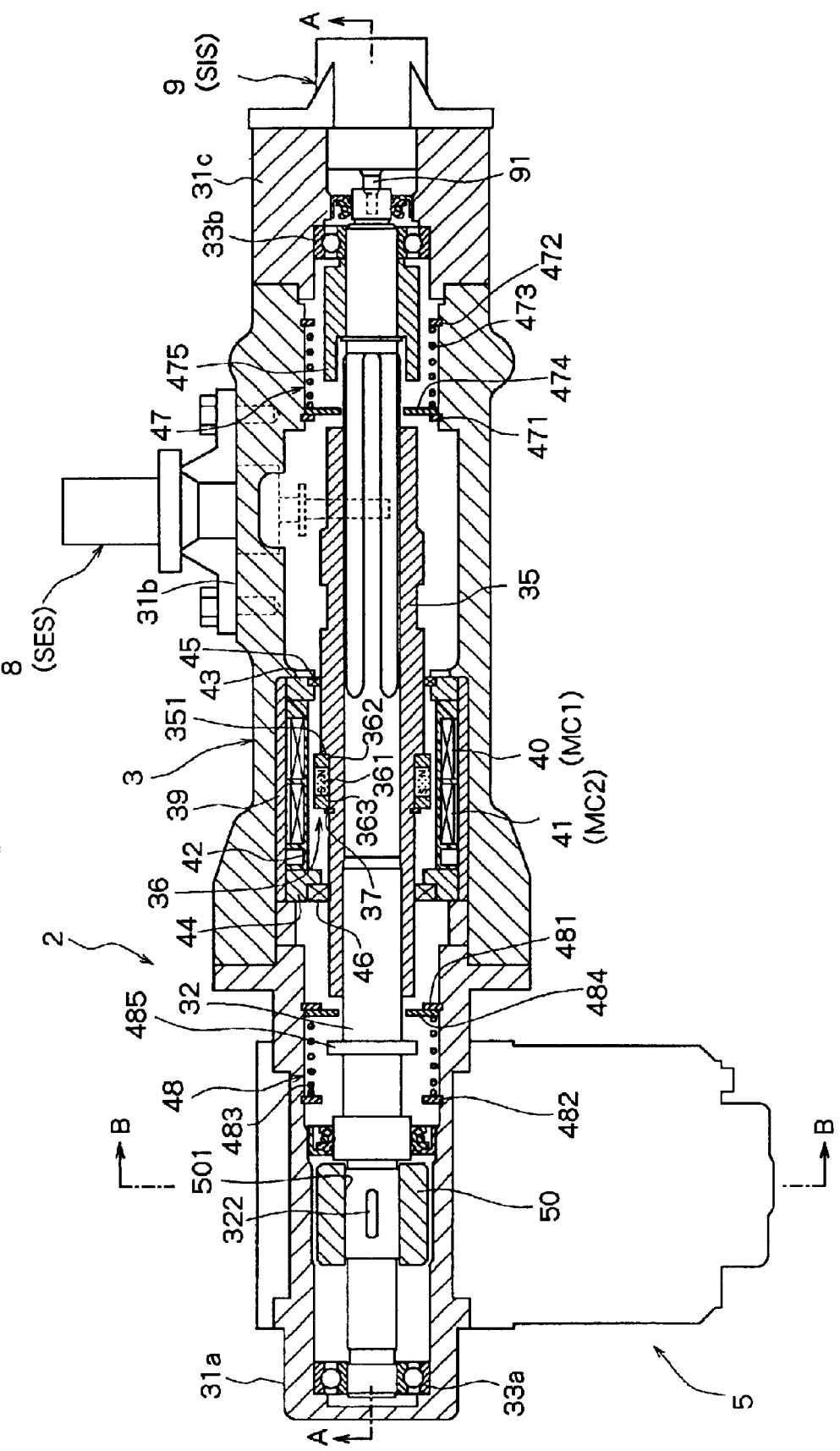
FIG. 2 is a sectional view illustrating a gear change device equipped with a shift actuator that constitutes the shifting device of the present invention.
Figure 3:
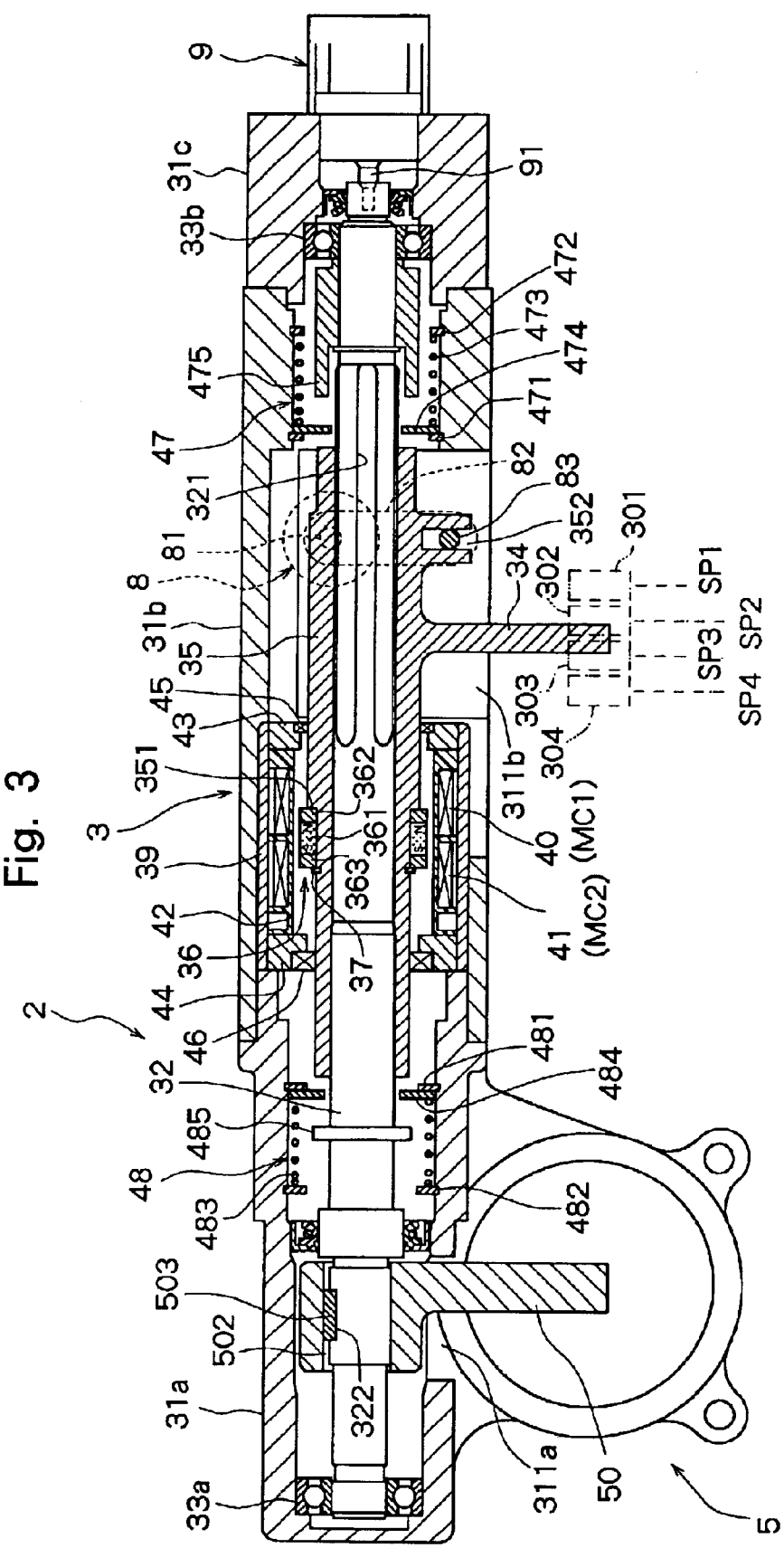
FIG. 3 is a sectional view along the line A—A in FIG. 2.
Figure 4:
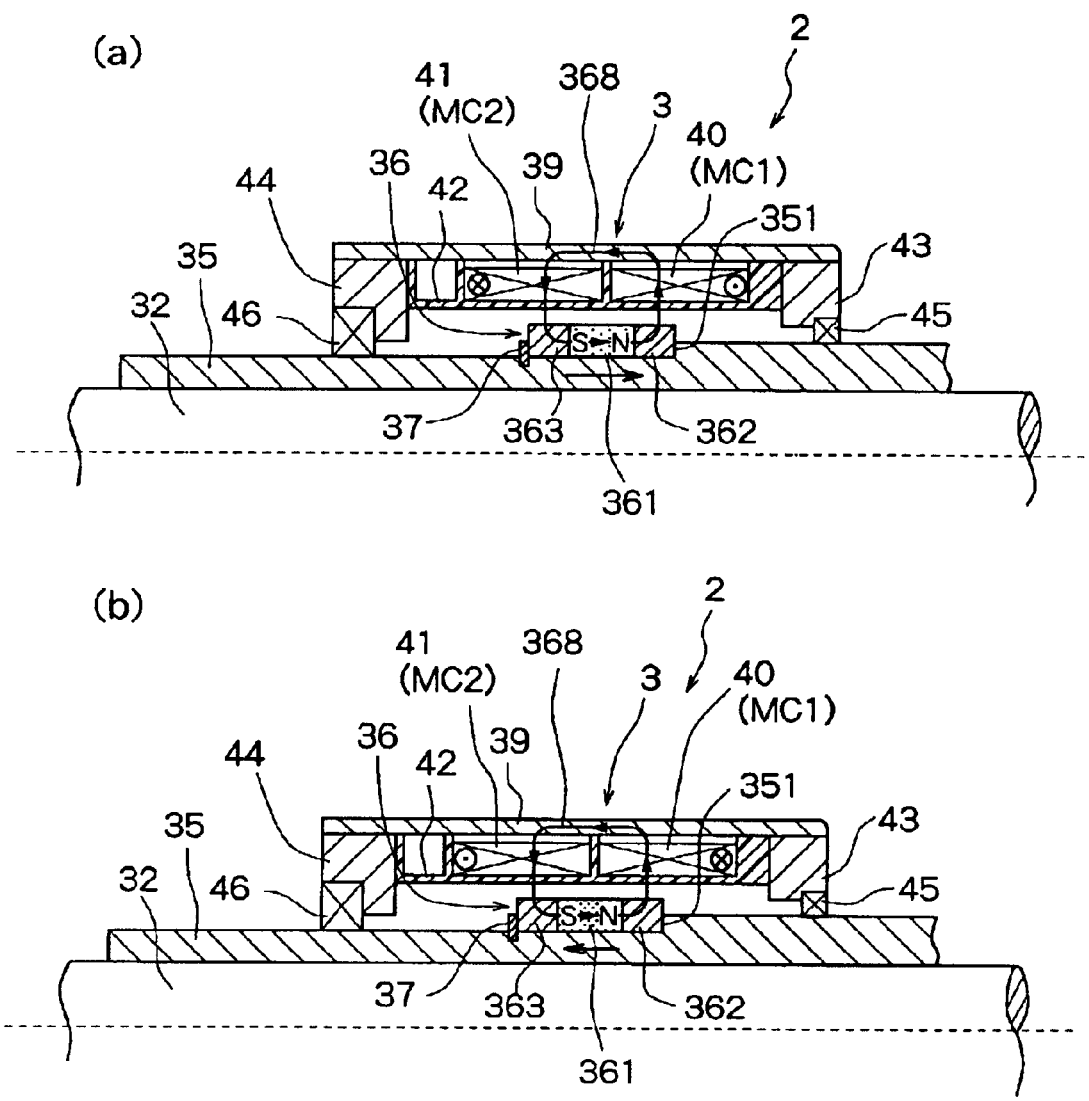
FIG. 4 is a view illustrating the operation of a select actuator that constitutes the gear change device shown in FIG. 2.

In the first select position-limiting means 47 constituted as described above, when a current of a voltage of, for example, 2.4 V is fed as shown in FIG. 4(a), to the pair of coils 40 (MC1) and 41 (MC2) in a state shown in FIGS. 2 and 3, the permanent magnet 361 or the shift sleeve 35 moves toward the right in FIGS. 2 and 3, whereby the right end of the shift sleeve 35 comes in contact with the moving ring 474 in FIGS. 2 and 3, and is limited for its position. In this state, the resilient force of the coil spring 473 has been set so as to be larger than the thrust acting on the permanent magnet 361 or on the shift sleeve 35. Therefore, the shift sleeve 35 that has come in contact with the moving ring 474 comes to a halt at a position where the moving ring 474 is in contact with the one snap ring 471. In this case, the shift lever 34 constituted integratedly with the shift sleeve 35 is brought to the second select position SP2. Next, when a current of a voltage of, for example, 4.8 V is fed to the pair of coils 40 (MC1) and 41 (MC2) as shown in FIG. 4(a), the thrust acting on the permanent magnet 361 or on the shift sleeve 35 has been set so as to be become larger than the resilient force of the coil spring 473. Hence, the shift sleeve 35 that has come in contact with the moving ring 474, then, moves toward the right in FIGS. 2 and 3 overcoming the resilient force of the coil spring 473, and is brought to a halt at a position where the moving ring 474 is in contact with the stopper 475. In this case, the shift lever 34 constituted integratedly with the shift sleeve 35 is brought to the first select position SP1.

Next, the second select position-limiting means 48 will be described.

The second select position-limiting means 48 comprises snap rings 481 and 482 mounted on the central casing 31b at the left end portion in FIGS. 2 and 3 at a predetermined distance, a compression coil spring 483 arranged between the snap rings 481 and 482, a moving ring 484 arranged between the compression coil spring 483 and one snap ring 481, and a stopper 485 which limits the motion of the moving ring 484 when the moving ring 484 has moved toward the left by a predetermined amount in FIGS. 2 and 3.

In the second select position-limiting means 48 constituted as described above, when a current of a voltage of, for example, 2.4 V is fed as shown in FIG. 4(b), to the pair of coils 40 (MC1) and 41 (MC2) in a state shown in FIGS. 2 and 3, the permanent magnet 361 or the shift sleeve 35 moves toward the left in FIGS. 2 and 3, whereby the left end of the shift sleeve 35 comes in contact with the moving ring 484 in FIGS. 2 and 3, and is limited for its position. In this state, the resilient force of the coil spring 483 has been so set as to be larger than the thrust acting on the permanent magnet 361 or on the shift sleeve 35. Therefore, the shift sleeve 35 that has come in contact with the moving ring 484 comes to a halt at a position where the moving ring 484 is in contact with the one snap ring 481. In this case, the shift lever 34 constituted integratedly with the shift sleeve 35 is brought to the third select position SP3. Next, when a current of a voltage of, for example, 4.8 V is fed to the pair of coils 40 (MC1) and 41 (MC2) as shown in FIG. 4(b), the thrust acting on the permanent magnet 361 or on the shift sleeve 35 has been so set as to become larger than the resilient force of the coil spring 483. Hence, the shift sleeve 35 that has come in contact with the moving ring 484, then, moves toward the left in FIGS. 2 and 3 overcoming the resilient force of the coil spring 483, and is brought to a halt at a position where the moving ring 484 is in contact with the stopper 485. In this case, the shift lever 34 constituted integratedly with the shift sleeve 35 is brought to the fourth select position SP4.

As described above, the illustrated embodiment is provided with the first select position-limiting means 47 and the second select position-limiting means 48. By controlling the amount of electric power fed to the pair of coils 40 (MC1) and 41 (MC2), therefore, the shift lever 34 can be brought to a predetermined select position without the need of controlling the position.

The gear change device according to the illustrated embodiment has a select position sensor 8 (SES) for detecting the position of the shift sleeve 35 integratedly constituted with the shift lever 34, i.e., for detecting the position thereof in the direction of selection. The select position sensor 8 (SES) comprises a potentiometer, and a rotary shaft 81 thereof is attached to one end portion of a lever 82. An engaging pin 83 attached to the other end portion of the lever 82 is engaged with an engaging groove 352 formed in the shift sleeve 35. Therefore, when the shift sleeve 35 moves toward the left or right in FIG. 2, the lever 82 swings on the rotary shaft 81 as a center, whereby the rotary shaft 81 rotates, and the operation position of the shift sleeve 35 is detected, i.e., the position thereof in the direction of selection is detected. The shift lever 34 can be brought to a desired select position by controlling the voltage and the direction of current fed to the coils 40 (MC1) and 41 (MC2) of the select actuator 3 by the control means 100 that will be described later based on a signal from the select position sensor 8 (SES).

Further, the gear change device 2 of the illustrated embodiment has a shift stroke position sensor 9 (SIS) for detecting a rotational position of the control shaft 32 mounting the shift sleeve 35 which is integratedly constituted with the shift lever 34, i.e., for detecting the shift stroke position thereof. The shift stroke position sensor 9 (SIS) comprises a potentiometer, its rotary shaft 91 being coupled to the control shaft 32. When the control shaft 32 turns, therefore, the rotary shaft 91 turns, and the rotational position of the control shaft 32 is detected, i.e., the shift stroke position thereof is detected.

Next, the shift actuator constituted according to the first embodiment of the present invention will be described with reference chiefly to FIG. 5 which is a sectional view along the line B—B in FIG. 2.

Figure 5:
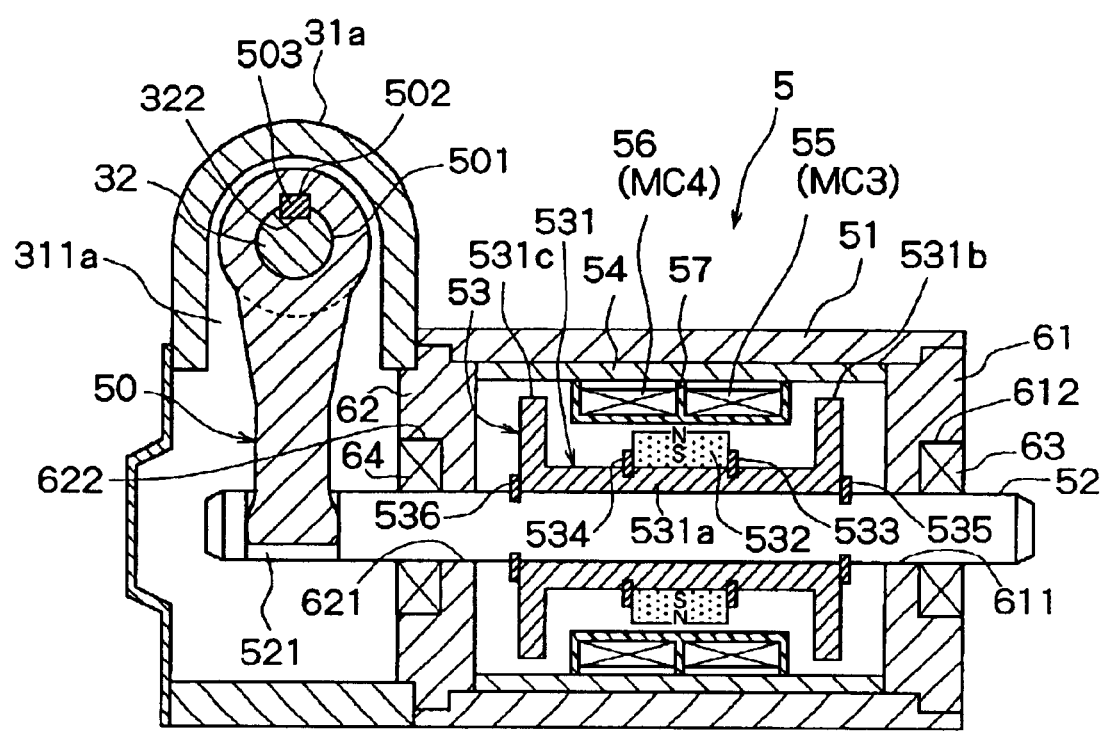
FIG. 5 is a sectional view along the line B—B in FIG. 2.

The illustrated shift actuator 5 according to the first embodiment shown in FIG. 5 comprises a casing 51, an operation rod 52 that is arranged in the central portion of the casing 51 and is fitted to the operation lever 50 mounted on the control shaft 32 arranged in the casings 31a, 31b and 31c of the select actuator 3, a magnetic moving member 53 arranged on the outer peripheral surface of the operation rod 52, a cylindrical fixed yoke 54 arranged inside the casing 51 surrounding the magnetic moving member 53, and a pair of coils 55 (MC3) and 56 (MC4) arranged side by side in the axial direction inside the fixed yoke 54. The operation lever 50 that engages with the operation rod 52 has a hole 501 in the base portion thereof to be fitted to the control shaft 32, and is so constituted as to turn integratedly with the control shaft 32 by fitting a key 503 into a key way 502 formed in the inner peripheral surface of the hole 501 and into a key way 322 formed in the outer peripheral surface of the control shaft 32. The operation lever 50 works as an operation member coupled to the shift lever 34 via the control shaft 32 and the shift sleeve 35, and is arranged passing through an opening 311a formed in the lower portion of the left casing 31a in FIGS. 2 and 3.

The casing 51 in the illustrated embodiment is made of a nonmagnetic material such as a stainless steel, an aluminum alloy or the like and is formed in a cylindrical shape. The operation rod 52 is made of a nonmagnetic material such as a stainless steel or the like, and has a notch 521 formed in the left end thereof in FIG. 5. An end of the operation lever 50 is brought into engagement with the notch 521.

The magnetic moving member 53 comprises a moving yoke 531 mounted on the outer peripheral surface of the operation rod 52, and an annular permanent magnet 532 arranged on the outer peripheral surface of the moving yoke 531 being opposed to the inner peripheral surfaces of the pair of coils 55 (MC3) and 56 (MC4). The moving yoke 531 is formed of a magnetic material, and has a cylindrical portion 531a on which the permanent magnet 532 is mounted, and annular flange portions 531b and 531c provided at both ends of the cylindrical portion 531a. The outer peripheral surfaces of the flange portions 531b and 531c are located closer to the inner peripheral surface of the fixed yoke 54. It is desired that the gap between the outer peripheral surfaces of the flange portions 531b, 531c and the inner peripheral surface of the fixed yoke 54 is as small as possible. By taking a production error and the like into consideration, however, the gap in the illustrated embodiment is set to be 0.5 mm. The thus constituted moving yoke 531 is limited for its motion in the axial direction by snap rings 535 and 536 mounted on the operation rod 52 on both sides thereof. The permanent magnet 532 has magnetic poles formed on the outer peripheral surface thereof and on the inner peripheral surface thereof. In the illustrated embodiment, the N-pole is formed on the outer peripheral surface and the S-pole is formed on the inner peripheral surface. The thus formed permanent magnet 532 is mounted on the outer peripheral surface of the cylindrical portion 531a of the moving yoke 531, and is limited from moving in the axial direction by the snap rings 533 and 534 mounted on the cylindrical portion 531a of the moving yoke 531 on both sides thereof.

The fixed yoke 54 is made of a magnetic material and is mounted on the inner peripheral surface of the casing 51. The pair of coils 55 (MC3) and 56 (MC4) is wound on a bobbin 57 that is made of a nonmagnetic material such as a synthetic resin or the like and is mounted on the inner periphery of the fixed yoke 54. The pair of coils 55 (MC3) and 56 (MC4) is connected to a power source circuit that is not shown, and the electric power fed thereto is controlled by the control means 100 that will be described later. The length of the pair of coils 55 (MC3) and 56 (MC4) in the axial direction is suitably set depending on the operation stroke of the shift actuator 5.

End walls 61 and 62 are mounted on both sides of the casing 51. The end walls 61 and 62 are formed of a nonmagnetic material such as a stainless steel, an aluminum alloy or a suitable synthetic resin, and have holes 611 and 621 formed in the central portions thereof, so that the operation rod 52 is inserted through therein. The operation rod 52 arranged being inserted in the holes 611 and 621, is supported by the inner peripheral surfaces of the holes 611 and 621 so as to slide in the axial direction. Notches 612 and 622 are formed in the end walls 61 and 62 in the inner peripheral portions on the outer sides thereof. Sealing members 63 and 64 are fitted to the notches 612 and 622.

The shift actuator 5 according to the first embodiment is constituted as described above, and its operation will now be described with reference to FIG. 6.

In the shift actuator 5 as shown in FIGS. 6(a) to 6(d), the first magnetic flux circuit 537 and the second magnetic flux circuit 538 are formed by the permanent magnet 532. That is, in the shift actuator 5 in the illustrated embodiment, there are established the first magnetic circuit 537 passing through the N-pole of the permanent magnet 532, one coil 55 (MC3) of the pair of coils, fixed yoke 54, flange portion 531b of the moving yoke 531, cylindrical portion 531a of the moving yoke 531, and S-pole of the permanent magnet 532, and the second magnetic circuit 538 passing through the N-pole of the permanent magnet 532, other coil 56 (MC4) of the pair of coils, fixed yoke 54, flange portion 531c of the moving yoke 531, cylindrical portion 531a of the moving yoke 531, and S-pole of the permanent magnet 532.

Figure 6:
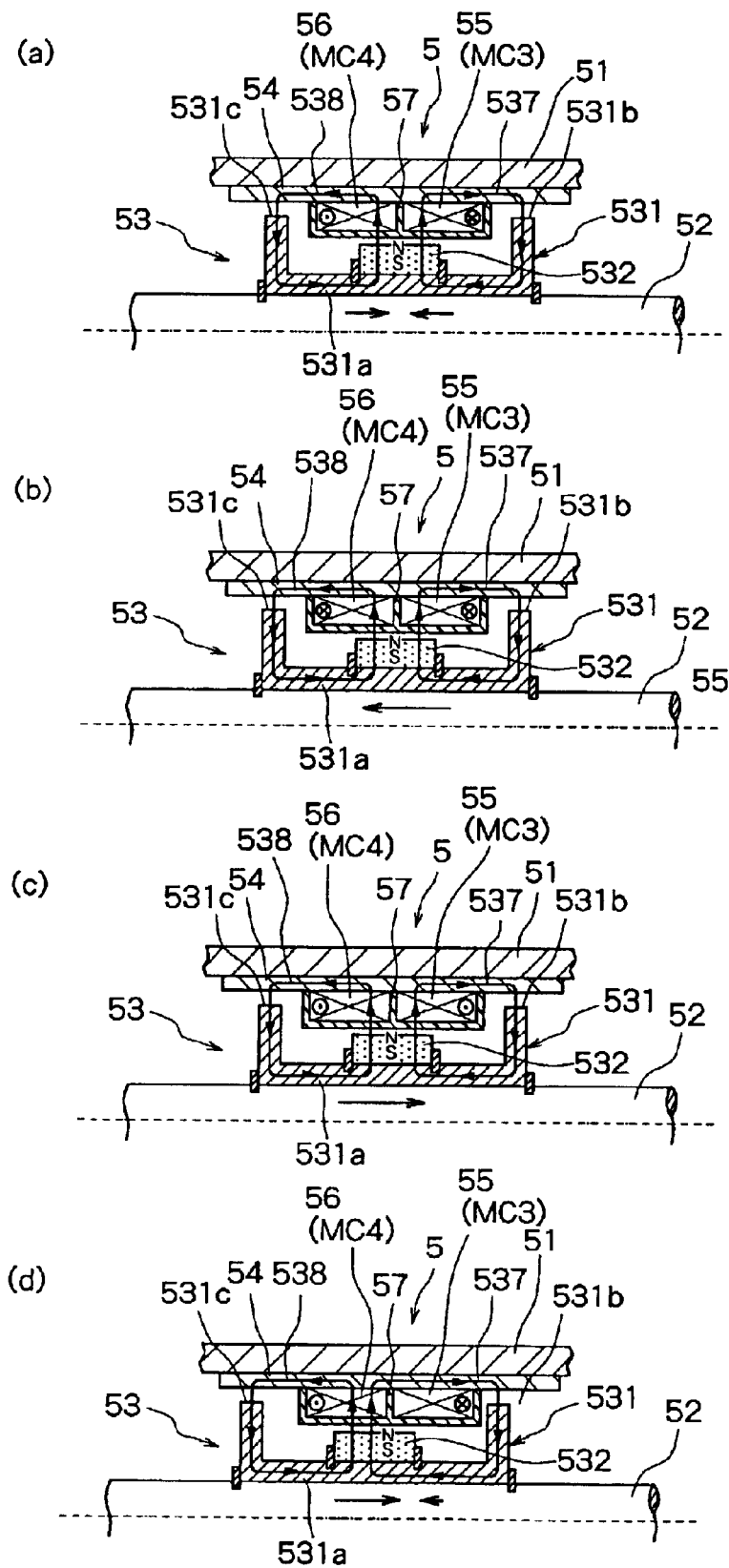
FIG. 6 is a view illustrating the states of operation of the shift actuator according to the first embodiment shown in FIG. 5.

When the electric currents are fed to the pair of coils 55 (MC3) and 56 (MC4) in the directions opposite to each other as shown in FIG. 6(a) in a state where the operation position of the operation rod 52 is at the neutral position shown in FIG. 6(a), thrusts are produced on the magnetic moving member 53 or the operation rod 52 according to the Fleming's left-hand rule in the directions to cancel each other as indicated by arrows. Therefore, the operation rod 52 is maintained at the neutral position shown in FIGS. 5 and 6.

Next, when the electric currents are supplied to the pair of coils 55 (MC3) and 56 (MC4) in the same direction as shown in FIG. 6(b) in a state where the operation position of the operation rod 52 is at the neutral position, the magnetic moving member 53 or the operation rod 52 produces a leftward thrust as indicated by an arrow in FIG. 6(b). As a result, the operation rod 52 moves toward the left in FIG. 5, whereby the control shaft 32 turns clockwise in FIG. 5 via the operation lever 50 which is engaged at its end portion with the operation rod 52. Accordingly, the shift lever 34 constituted integratedly with the shift sleeve 35 which is mounted on the control shaft 32 is shifted in one direction.

Further, when the electric currents are fed to the pair of coils 55 (MC3) and 56 (MC4) in the direction opposite to the direction of FIG. 6(b) as shown in FIG. 6(c) in a state where the operation position of the operation rod 52 is at the neutral position, a rightward thrust is produced on the magnetic moving member 53 or on the operation rod 52 as indicated by an arrow in FIG. 6(c). As a result, the operation rod 52 moves toward the right in FIG. 5, whereby the control shaft 32 turns counterclockwise in FIG. 5 via the operation lever 50. Accordingly, the shift lever 34 constituted integratedly with the shift sleeve 35 which is mounted on the control shaft 32, is shifted in the other direction.

On the other hand, when the electric currents are fed to the pair of coils 55 (MC3) and 56 (MC4) in the directions opposite to each other as shown in FIG. 6(d) in a state where the operation rod 52 has been moved to the left in FIG. 5, thrusts are produced on the magnetic moving member 53 or the operation rod 52 in the directions to cancel each other as indicated by arrows. In this state where the operation rod 52 or the magnetic moving member 53 has been moved to the left, there are produced magnetic fluxes passing through the coils due to the first magnetic flux circuit 537 and the second magnetic flux circuit 538 formed by the permanent magnet 532. In this case, however, the amount of magnetic flux passing through the coil 56 (MC4) is larger than the amount of magnetic flux passing through the coil 55 (MC3). As a result of feeding the current to the other coil 56 (MC3) in the direction shown in FIG. 6(d), therefore, the rightward thrust produced by the magnetic moving member 53, i.e., produced by the operation rod 52 becomes larger than the leftward thrust produced by the magnetic moving member 53, i.e., produced by the operation rod 52 as a result of feeding the current to the one coil 55 (MC3) in the direction shown in FIG. 6(d). As a result, the operation rod 52 moves rightward in FIG. 6(d). As the operation rod 52 moving rightward in FIG. 6(d) approaches the neutral position, the amount of magnetic flux passing through the coil 56 (MC4) decreases and the amount of magnetic flux passing through the coil 55 (MC3) increases. When the operation rod 52 arrives at the neutral position, the amount of magnetic flux passing through the coil 55 (MC3) becomes equal to the amount of magnetic flux passing through the coil 56 (MC4). As a result, the leftward thrust and the rightward thrust produced by the operation rod 52 become equal to each other, and the operation rod 52 comes to a halt at the neutral position.

As described above, the shift actuator 5 according to the first embodiment operates based on the principle of a linear motor of which the operation rod 52 is constituted by the magnetic moving member 53, fixed yoke 54 and pair of coils 55 (MC3) and 56 (MC4), featuring improved durability since it has no rotary mechanism. Besides, the shift actuator 5 can be constituted in a compact size and can be operated at an increased operation speed since it needs neither a ball-screw mechanism nor a reduction mechanism which is a gear mechanism, unlike the actuator that uses an electric motor. In the shift actuator of the first embodiment, further, the outer peripheral surfaces of the flange portions 531b and 531c of the moving yoke 531 constituting the magnetic moving member 53 are located close to the inner peripheral surface of the fixed yoke 54. Hence, a large air gap for the magnetic flux is formed by the coils 55 (MC3) and 56 (MC4) only, making it possible to minimize the air gap in the first magnetic flux circuit 537 and in the second magnetic flux circuit 538 established by the permanent magnet 532 and to produce a large thrust.

Next, the shift actuator constituted according to the second embodiment of the present invention will be described with reference to FIGS. 7 and 8.

Figure 7:
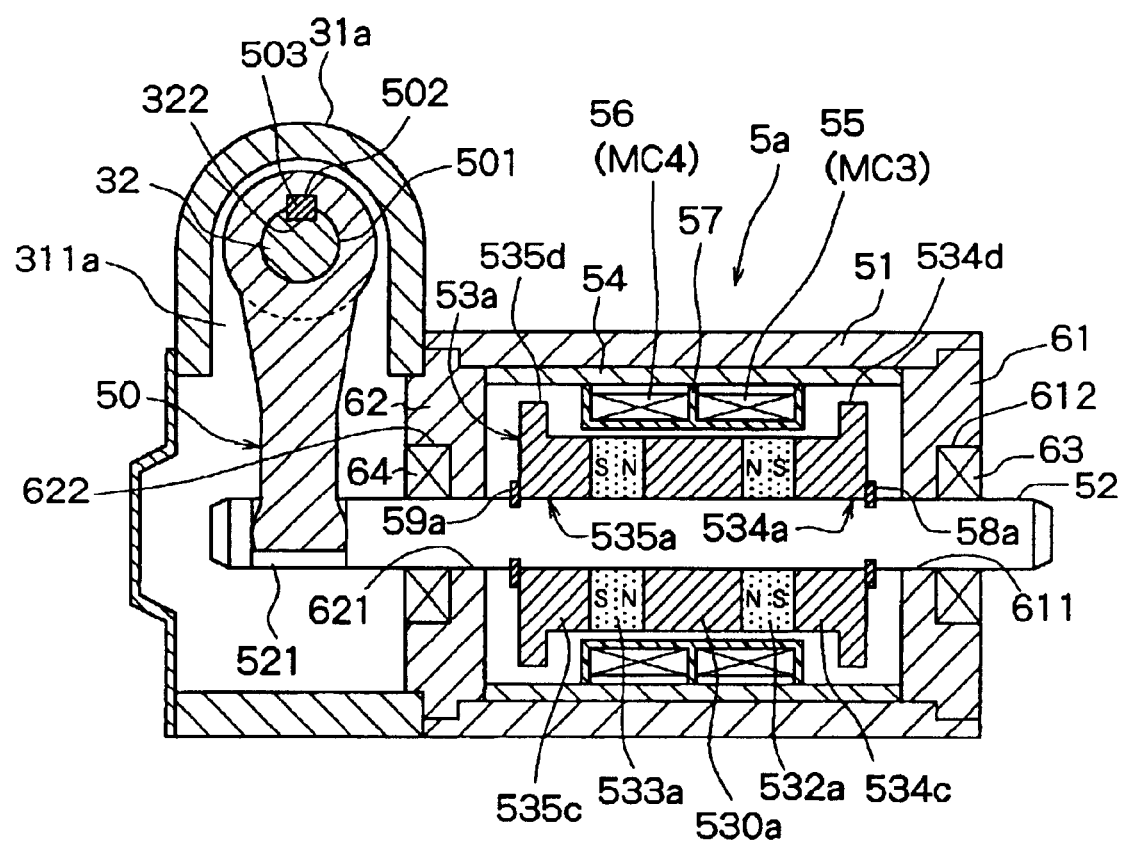
FIG. 7 is a sectional view illustrating the second embodiment of the shift actuator.

In the shift actuator 5a according to the second embodiment shown in FIG. 7, the magnetic moving member 53a arranged on the operation rod 52 is different from the magnetic moving member 53 of the shift actuator 5 of the first embodiment. In regard to other constituent members, however, the shift actuator 5a of the second embodiment may be substantially the same as the shift actuator 5 of the first embodiment. In FIG. 7, therefore, the constituent members same as those members constituting the shift actuator 5 of the first embodiment are denoted by the same reference numerals.

The magnetic moving member 53a constituting the shift actuator 5a of the second embodiment comprises an intermediate yoke 530a arranged on the outer peripheral surface of the operation rod 2 being opposed to the inner peripheral surfaces of the pair of coils 55 (MC3) and 56 (MC4), a pair of permanent magnets 532a and 533a arranged on, both sides of the intermediate yoke 530a to hold it therebetween, and a pair of moving yokes 534a and 535a arranged on the outer sides of the pair of permanent magnets 532a and 533a in the axial direction thereof. The intermediate yoke 530a is made of a magnetic material and is formed in an annular shape. The pair of permanent magnets 532a and 533a has magnetic poles on both end surfaces in the axial direction. In the illustrated embodiment, N-pole is formed on the opposing end surfaces, and the S-pole is formed on the outer end surfaces in the axial direction thereof. The pair of moving yokes 534a and 535a is made of a magnetic material, has cylindrical portions 534c, 535c, and annular flange portions 534d, 535d formed on the outer ends of the cylindrical portions 534c, 535c in the axial direction thereof. The outer peripheral surfaces of the flange portions 534d, 535d are located closer to the inner peripheral surface of the fixed yoke 54. The gap between the outer peripheral surfaces of the flange portions 534d, 535d and the inner peripheral surface of the fixed yoke 54 is set to be 0.5 mm, like that of the shift actuator 5 of the above-mentioned first embodiment. In the illustrated embodiment, the pair of moving yokes 534a and 535a is constituted by the cylindrical portions 534c, 535c and by the flange portions 534d, 535d. They, however, may be constituted by only the flange portions having the outer peripheral surfaces which locate close to the inner peripheral surface of the fixed yoke 54. The thus constituted pair of moving yokes 534a and 535a is limited from moving in the axial direction by snap rings 58a and 59a mounted on the operation rod 52 on the outer sides thereof in the axial direction.

The shift actuator 5a according to the second embodiment is constituted as described above, and its operation will now be described with reference to FIG. 8.

In the shift actuator 5a according to the second embodiment as shown in FIGS. 8(a) to 8(d), there are formed the first magnetic flux circuit 537a and the second magnetic flux circuit 538a by the pair of permanent magnets 532a and 533a. When the electric currents are fed to the pair of coils 55 (MC3) and 56 (MC4) in the directions opposite to each other as shown in FIG. 8(a) in a state where the operation position of the operation rod 52 is at the neutral position as shown in FIG. 8(a), thrusts are produced on the magnetic moving member 53a or on the operation rod 52 in the directions to cancel each other as indicated by arrows according to the Fleming's left-hand rule. Therefore, the operation rod 52 is maintained at the neutral position shown in FIGS. 7 and 8(a).

Next, when the electric currents are fed to the pair of coils 55 (MC3) and 56 (MC4) in the same direction as shown in FIG. 8(b) in a state where the operation position of the operation rod 52 is at the neutral position, a leftward thrust is produced on the magnetic moving member 53a or on the operation rod 52 as indicated by an arrow in FIG. 8(b). AS a result, the operation rod 52 moves toward the left in FIG. 8(b).

Further, when the electric currents are fed to the pair of coils 55 (MC3) and 56 (MC4) in the direction opposite to the direction of FIG. 8(b) as shown in FIG. 8(c) in a state where the operation position of the operation rod 52 is at the neutral position, a rightward thrust is produced on the magnetic moving member 53a or on the operation rod 52 as indicated by an arrow in FIG. 8(c). As a result, the operation rod 52 moves toward the right in FIG. 8(c).

Figure 8:
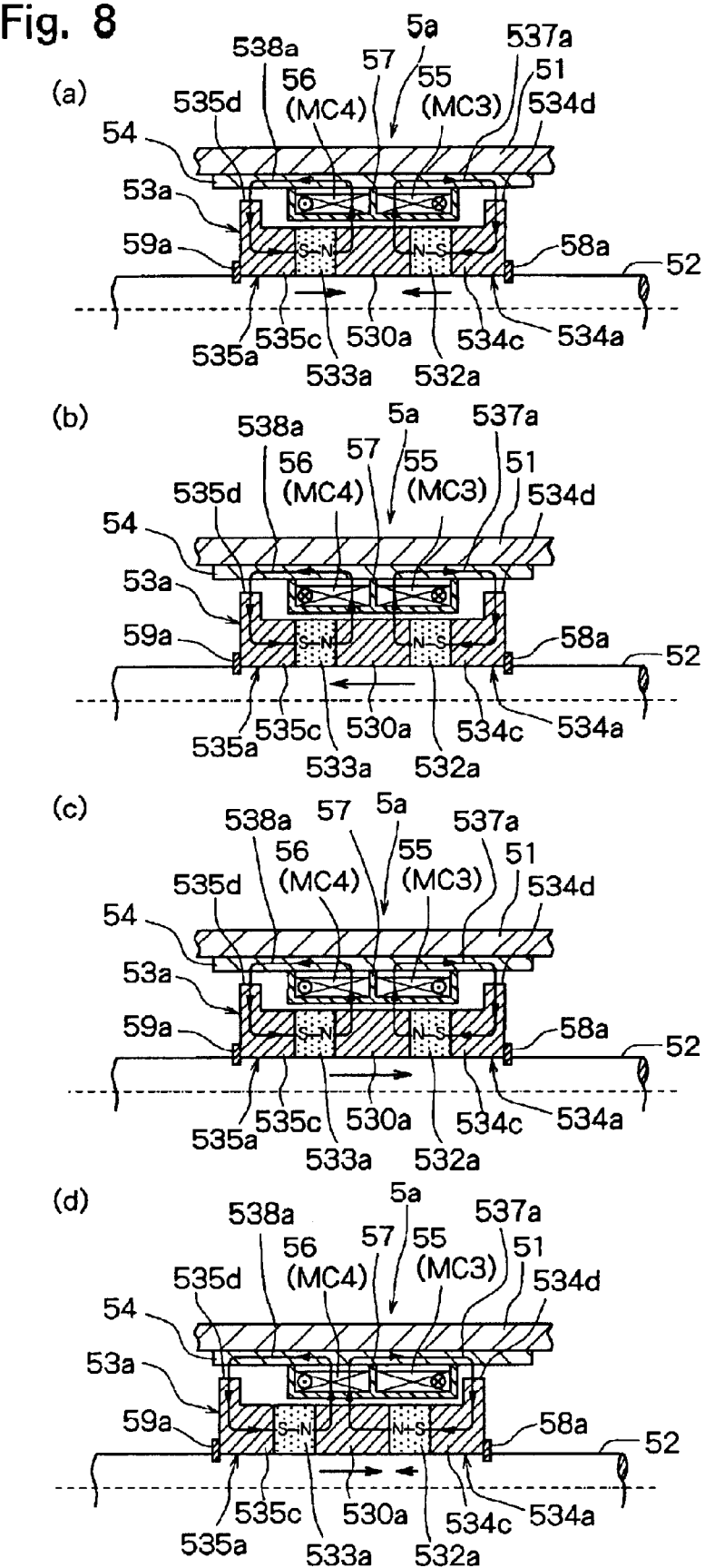
FIG. 8 is a view illustrating the states of operation of the shift actuator according to the second embodiment shown in FIG. 7.

On the other hand, when the electric currents are fed to the pair of coils 55 (MC3) and 56 (MC4) in the directions opposite to each other as shown in FIG. 8(d) in a state where the operation rod 52 has been moved to the left in FIG. 8, the rightward thrust is produced on the magnetic moving member 53a or on the operation rod 52 as indicated by an arrow in FIG. 8(d) due to the electric current flowing into the other coil 56 (MC4) since both the first magnetic flux circuit 537 and the second magnetic flux circuit 538 are passing through the other coil 56 (MC4). Thus, as the operation rod 52 moving rightward in FIG. 8(d) approaches the neutral position, the first magnetic flux circuit 537a formed by one permanent magnet 532a passes through one coil 55 (MC3). Due to the electric current flowing into one coil 55 (MC3), therefore, the leftward thrust shown in FIG. 8(d) acts on the magnetic moving member 53a, i.e., on the operation rod 52. The leftward thrust due to the current flowing into one coil 55 (MC3) increases as the magnetic moving member 53a, i.e., the operation rod 52 approaches the neutral position. When the magnetic moving member 53a or the operation rod 52 arrives at the neutral position, the leftward thrust due to the current flowing into the one coil 55 (MC3) becomes equal to the rightward thrust due to the current flowing into the other coil 56 (MC4). As a result, the magnetic moving member 53a or the operation rod 52 comes to a halt at the neutral position.

As described above, in the shift actuator 5a according to the second embodiment, the pair of permanent magnets 532a and 533a constituting the magnetic moving member 53a are arranged to hold the intermediate yoke 530a therebetween, and the N-pole is formed in the opposing end surfaces of the pair of permanent magnets 532a and 533a. Therefore, the magnetic fluxes emitted from the two permanent magnets 532a and 533a are headed toward the pair of coils 55 (MC3) and 56 (MC4) while repelling each other. In the shift actuator 5a according to the second embodiment, therefore, the magnetic flux passes through the pair of coils 55 (MC3) and 56 (MC4) at right angles, and hence, an increased thrust is produced on the magnetic moving member 53a or on the operation rod 52. Here, the S-pole may be formed in the end surfaces facing each other of the pair of permanent magnets 532a and 533a. Namely, it is desired that the end surfaces opposing each other of the pair of permanent magnets 532a and 533a possess the same polarity. In the shift actuator 5a of the second embodiment, further, the inner peripheral surface of the fixed yoke 54 is located close to the outer peripheral surfaces of the flange portions 534d, 535d of the pair of moving yokes 534a, 535a constituting the magnetic moving member 53a. Therefore, a large air gap for the magnetic flux is formed by the pair of coils 55 (MC3) and 56 (MC4) only. Accordingly, the shift actuator 5a according to the second embodiment makes it possible to minimize the air gap in the magnetic flux circuits established by the pair of permanent magnets 532a and 533a and, hence, to produce a large thrust.

Reverting to FIG. 1, the illustrated embodiment comprises an input shaft rotational speed detecting means 111 (ISS) for detecting the rotational speed of the input shaft 141 of the transmission 14, and an output shaft rotational speed detecting means 112 (OSS) for detecting the rotational speed of the output shaft 142 of the transmission 14. The input shaft rotational speed detecting means 111 (ISS) comprises a pulse generator arranged facing the input shaft 141 of the transmission 14, and its detection signal is sent to the control means 100. The output shaft rotational speed detecting means 112 (OSS) comprises a pulse generator arranged facing the output shaft 142 of the transmission 14, and its detection signal is sent to the control means 100. Further, the illustrated embodiment comprises a target gear position instruction means 113 (GCS) for instructing a target gear position. The target gear position instruction means 113 (GCS) sends a gear position instruction signal to the control means 100.

The control means 100 is constituted by a microcomputer, and has a central processing unit (CPU) 101 for executing the arithmetic operation according to a control program, a read-only memory (ROM) 102 for storing the control program, a random access memory (RAM) 103 for storing the operated results, a timer (T) 104, an input interface 105 and an output interface 106. The input interface 105 of the thus constituted control means 100 receives signals from the select position sensor 8 (SES), from the shift stroke position sensor 9 (SIS), from the input shaft rotational speed detecting means 111 (ISS), from the output shaft rotational speed detecting means 112 (OSS), and from the target gear position instruction means 113 (GCS). The output interface 106 sends control signals to the pair of coils 40 (MC1), 41 (MC2) of the select actuator 3, to the pair of coils 55 (MC3), 56 (MC4) of the shift actuator 5, and to the control valves (not shown) of the wet-type multi-plate clutch 13 (CLT).

Figure 9:
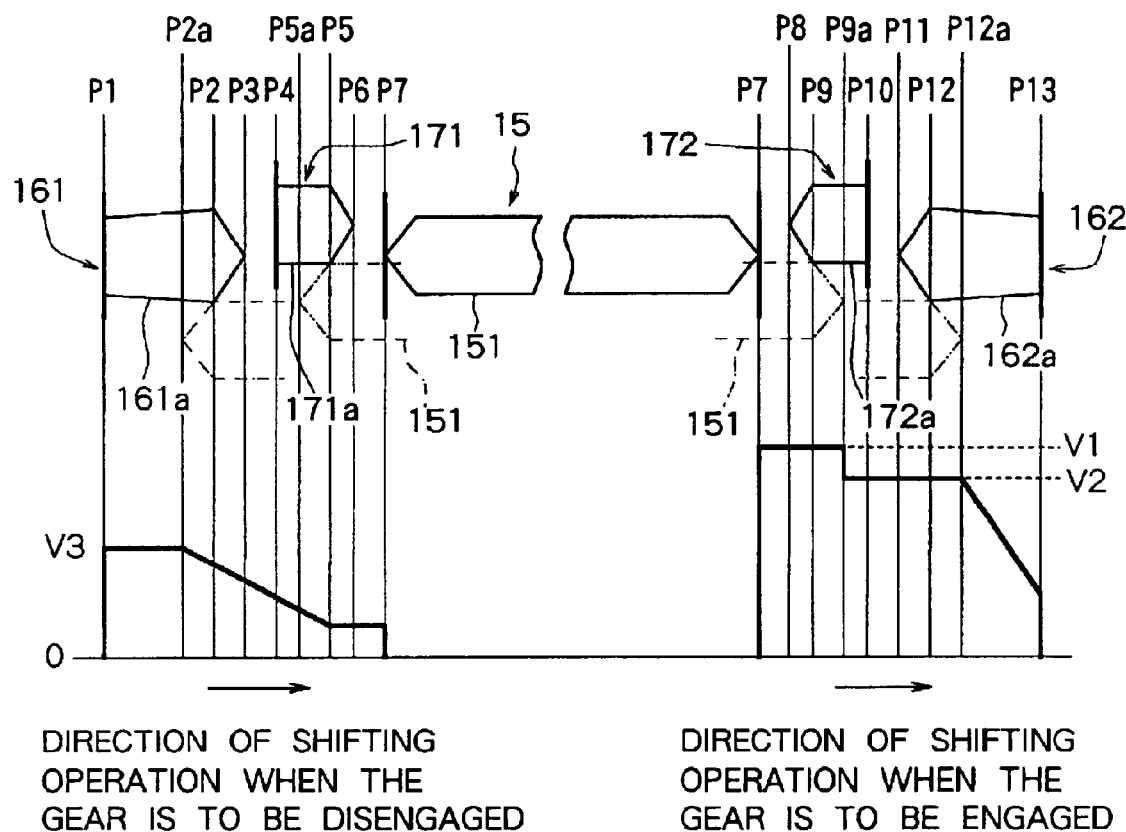
FIG. 9 is a diagram illustrating relationships between the shift stroke positions of the clutch sleeve of a synchronizing mechanism provided in the transmission constituting the drive unit for a vehicle shown in FIG. 1 and the voltages applied to a pair of coils of the shift actuator at the time of shifting for engaging the gears.

Next, described below with reference to FIG. 9 is a relationship among the spline, dog teeth of the speed change gear and teeth of the synchronizer ring in the clutch sleeve of the synchronizing mechanism in the transmission 14.

In FIG. 9, reference numeral 151 denotes a spline of a clutch sleeve 15 in the synchronizing mechanism, 161a denotes dog teeth of one speed change gear 161 that engage with the clutch sleeve 15, 171a denotes teeth of a synchronizer ring 171 arranged between the clutch sleeve 15 and the dog teeth 161a, 162a denotes dog teeth of the other speed change gear 162 that engage with the clutch sleeve 15, and 172a denotes teeth of a synchronizer ring 172 arranged between the clutch sleeve 15 and the dog teeth 162a.

In FIG. 9, a shift stroke position of the clutch sleeve in its neutral state is designated at P7. Symbol P6 denotes a shift stroke position (synchronization start position when the gear is to be engaged) of the clutch sleeve 15 that moves from the neutral state toward the one speed change gear 161 side (toward the left in FIG. 9) and arrives at the front end of the chamfer of the teeth 171a of the synchronizer ring 171, P5 denotes a shift stroke position of the clutch sleeve that arrives at the rear end of the chamfer of the teeth 171a of the synchronizer ring 171, P5a denotes a shift stroke position (synchronism end position when the gear is to be engaged) where the rear end of the chamfer of the spline 151 of the clutch sleeve 15 arrives at the rear end of the chamfer of the teeth 171a, P4 denotes a shift stroke position of the clutch sleeve that arrives at the rear end of the teeth 171a of the synchronizer ring 171, P3 denotes a shift stroke position of the clutch sleeve that arrives at the front end of the chamfer of the dog teeth 161a for the one speed change gear 161, P2 denotes a shift stroke position of the clutch sleeve that arrives at the rear end of the chamfer of the dog teeth 161a, P2a denotes a shift stroke position (position where the engagement between the chamfer of the clutch sleeve and the chamfer of the dogteeth ends) where the rear end of the chamfer of the spline 151 of the clutch sleeve 15 arrives at the rear end of the chamfer of the dog teeth 161a, and P1 denotes a shift stroke position of the clutch sleeve that arrives at he rear end of the dog teeth 161a.

Further, symbol P8 denotes a shift stroke position (synchronization start position when the gear is to be engaged) of the clutch sleeve 15 that moves from the neutral state toward the other speed change gear 162 (toward the right in FIG. 9) and arrives at the front end of the chamfer of the teeth 172a of the synchronizer ring 172, P9 denotes a shift stroke position of the clutch sleeve that arrives at the rear end of the chamfer of the teeth 172a of the synchronizer ring 172, P9a denotes a shift stroke position (synchronization end position when the gear is to be engaged) of when the rear end of the chamfer of the spline 151 of the clutch sleeve 15 arrives at the rear end of the chamfer of the teeth 172a of the synchronizer ring 172, P10 denotes a shift stroke position of the clutch sleeve that arrives at the rear end of the teeth 172a of the synchronizer ring 172, P11 denotes a shift stroke position of the clutch sleeve that arrives at the front end of the chamfer of the dog teeth 162a for the other speed change gear 162, P12 denotes a shift stroke position of the clutch sleeve that arrives at the rear end of the chamfer of the dog teeth 172a, P12a denotes a shift stroke position (position where the engagement between the chamfer of the clutch sleeve and the chamfer of the dog teeth ends) of when the rear end of the chamfer of the spline 151 of the clutch sleeve 15 arrives at the rear end of the chamfer of the dog teeth 162a, and P13 denotes a shift stroke position of the clutch sleeve that arrives at the rear end of the dog teeth 162a. The shift stroke positions are detected by the shift stroke sensor 9 (SIS). In the illustrated embodiment, the shift stroke sensor 9 (SIS) is so constituted as to produce a voltage signal of the smallest value when the shift stroke position is P1, to produce the output voltage that gradually increases as the shift stroke position goes toward the P13 side, and produces a voltage signal of the largest value when the shift stroke position is P13.

The shifting device for a transmission according to the illustrated embodiment is constituted as described above. The procedure of shift control operation of the above control means 100 will now be described with reference to a flowchart shown in FIGS. 10 and 11.

The control means 100 checks at step S1 whether a target gear position instructed by the target gear position instruction means 113 (GCS) is out of agreement with the present gear judged based on the detection signals from the select position sensor 8 (SES) and from the shift stroke position sensor 9 (SIS). When the target gear position is in agreement with the present gear, there is no need of changing the gear, and the routine ends. When the target gear position is not in agreement with the present gear at step S1, the control means 100 proceeds to step S2 where the wet-type multi-plate clutch 13 (CLT) is disconnected. The control means 100, then, proceeds to step S3 where it is checked whether the shift stroke position P is in the neutral range (P6<P<P8). When the shift stroke position P is not in the neutral range (P6<P<P8), the control means 100 proceeds to step S4 where a predetermined voltage is applied to the pair of coils 55 (MC3) and 56 (MC4) of the shift actuator 5. As aresult, the shift actuator 5 is operated toward the neutral position as described earlier. At this moment, the current fed to the one coil 55 (MC3) is controlled to flow in one direction as shown in FIGS. 6(a) and 7(a), and the current fed to the other coil 56 (MC4) is controlled to flow in the other direction as shown in FIGS. 6(a) and 7(a). In the control operation toward the neutral position (gear disengaging control operation), the voltage applied to the pair of coils 55 (MC3) and 56 (MC4) is set to be the third set voltage V3 over a range of from the shift stroke position P1 or P13 to P2a or P12a (range in which the clutch sleeve is in mesh with the dog teeth), and the voltage applied to the pair of coils 55 (MC3) and 56 (MC4) is gradually lowered from the shift stroke position P2a or P12a toward the neutral side. The third set voltage V3 applied to the pair of coils 55 (MC3) and 56 (MC4) is smaller than the first set voltage V1 and the second set voltage V2 applied during the gear-engaging operation that will be described later.

When the predetermined voltage is applied to the pair of coils 55 (MC3) and 56 (MC4) at step S4, the control means 100 proceeds to step S3 to check whether the shift stroke position P is in the neutral range (P6<P<P8). When the shift stroke position P is not yet lying in the neutral range (P6<P<P8), the processing of steps S3 and S4 is repeated.

When the shift stroke position P is lying in the neutral range (P6<P<P8) at step S3, the control means 100 proceeds to step S5 to execute the select control. The select control is executed by controlling the voltage applied to the pair of coils 40 (MC1) and 41 (MC2) of the select actuator 3 in response to the selected position of the instructed target gear position as described above.

After the select control is executed at step S5, the control means 100 proceeds to step S6 where it is checked whether the target gear position instructed by the target gear position instruction means 113 (GCS) is any one of the first gear, third gear or fifth gear. When the target gear position is none of the first gear, third gear or fifth gear, the control means 100 proceeds to step S7 where it is checked whether the target gear position instructed by the target gear position instruction means 113 (GCS) is any one of the reverse gear (R), second gear, fourth gear or sixth gear. When the target gear position is none of the reverse gear (R), second gear, fourth gear or sixth gear, the control means 100 judges that the target gear position is neutral and that there is no need of changing the gear. The routine therefore ends.

When it is judged at step S6 that the target gear position is any one of the first gear position, third gear position or fifth gear position, the control means 100 proceeds to step S8 where, for example, the first set voltage (V1) is applied to the pair of coils 55 (MC3) and 56 (MC4) of the shift actuator 5. At this moment, the current fed to the pair of coils 55 (MC3) and 56 (MC4) is so controlled as to flow in one direction as shown in FIGS. 6(b) and 8(b). As a result, the shift actuator 5 is caused to move toward one speed change gear 161 side as described earlier. Next, the control means 100 proceeds to step S9 to check whether the shift stroke position P has exceeded the shift stroke position P5*a* (synchronization end position in the gear-engaging operation) (P<P5*a*) where the rear end of the chamfer of the spline 151 of the clutch sleeve 15 arrives at the rear end of the chamfer of the tooth 171*a* of the synchronizer ring 171. When the shift stroke position P does not exceed P5*a*, the control means 100 returns back to step S8 to repeat the processing of steps S8 and S9. When the shift stroke position P has exceeded P5*a* (P<P5*a*) at step S9, the control means 100 proceeds to step S10 where the second set voltage (V2) lower than the first set voltage (V1) is applied to the pair of coils 55 (MC3) and 56 (MC4) of the shift actuator 5. In this case, too, the current fed to the pair of coils 55 (MC3) and 56 (MC4) is so controlled as to flow in one direction as shown in FIGS. 6(*b*) and 8(*b*).

Next, the control means 100 proceeds to step S11 to check whether the shift stroke position P has exceeded the shift stroke position P2*a* (position where the engagement between the chamfer of the clutch sleeve and the chamfer of the dog teeth ends)(P<2*a*) where the rear end of the chamfer of the spline 151 of the clutch sleeve 15 arrives at the rear end of the chamfer of the dog teeth 161*a*. When the shift stroke position P does not exceed P2*a*, the control means 100 returns back to step S10 to repeat the processing of steps S10 and S11. When the shift stroke position P has exceeded P2*a* (P<P2*a*) at step S11, the control means 100 proceeds to step S12 where the voltage applied to the pair of coils 55 (MC3) and 56 (MC4) of the shift actuator 5 is caused to be gradually lowered.

Then, the control means 100 proceeds to step S13 to check whether the shift stroke position P has arrived at the position P1 (shift stroke end) where it arrives at the end of the dog teeth 161*a*. When the shift stroke position P does not arrive at the shift stroke end P1, the control means 100 repeats the processing of steps S12 and S13. When the shift stroke position P has arrived at the shift stroke end P1 at step S13, the control means 100 so judges that the spline 151 of the clutch sleeve 15 is in mesh with the dog teeth 161*a* of the one speed change gear 161 and that the gear-engaging operation has finished. The control means 100, then, proceeds to step S14 to de-energize (turn off) the pair of coils 55 (MC3) and 56 (MC4) of the shift actuator 5. The control means 100, then, proceeds to step S15 to connect the wet-type multi-plate clutch 13 (CLT).

Next, described below is a case where the target gear position instructed by the target gear position instruction means 113 (GCS) is any one of the reverse gear position (R), second gear position, fourth gear position or sixth gear position.

When it is judged at step S7 that the target gear position is any one of the reverse gear position (R), second gear position, fourth gear position or sixth gear position, the control means 100 proceeds to step S16 to apply, for example, the first set voltage (V1) to the pair of coils 55 (MC3) and 56 (MC4) of the shift actuator 5. At this moment, the current fed to the pair of coils 55 (MC3) and 56 (MC4) is so controlled as to flow in the other direction as shown in FIGS. 6(*c*) and 8(*c*). As a result, the shift actuator 5 is caused to move toward the other speed change gear 162 side as described earlier. Next, the control means proceeds to step S17 to check whether the shift stroke position P has exceeded the shift stroke position P9*a* (position where the synchronization ends in the gear-engaging operation) (P>P9*a*) where the rear end of the chamfer of the spline 151 of the clutch sleeve 15 arrives at the rear end of the chamfer of the teeth 172*a* of the synchronizer ring 172. When the shift stroke position P does not exceed P9*a*, the control means 100 returns back to step S16 to repeat the processing of steps S16 and S17. When the shift stroke position P has exceeded P9*a* (P>P9*a*) at step S17, the control means 100 proceeds to step S18 where the second set voltage (V2) lower than the first set voltage (V1) is applied to the pair of coils 55 (MC3) and 56 (MC4) of the shift actuator 5. In this case, too, the current fed to the pair of coils 55 (MC3) and 56 (MC4) is so controlled as to flow in the other direction as shown in FIGS. 6(*b*) and 8(*b*).

Next, the control means 100 proceeds to step S19 to check whether the shift stroke position P has exceeded the shift stroke position P12*a* (position where the engagement between the chamfer of the clutch sleeve and the chamfer of the dog teeth ends) (P>12*a*) where the rear end of the chamfer of the spline 151 of the clutch sleeve 15 arrives at the rear end of the chamfer of the dog teeth 162*a*. When the shift stroke position P does not exceed P12*a*, the control means 100 returns back to step S18 to repeat the processing of steps S18 and S19. When the shift stroke position P has exceeded P12*a* (P>P12*a*) at step S19, the control means 100 proceeds to step S20 where the voltage applied to the pair of coils 55 (MC3) and 56 (MC4) of the shift actuator 5 is caused to be gradually lowered.

Then, the control means 100 proceeds to step S21 to check whether the shift stroke position P has arrived at the position P13 (shift stroke end) where it arrives at the end of the dog teeth 161*a*. When the shift stroke position P does not arrive at the shift stroke end P13, the control means 100 repeats the processing of steps S20 and S21. When the shift stroke position P has arrived at the shift stroke end P13 at step S21, the control means 100 so judges that the spline 151 of the clutch sleeve 15 is in mesh with the dog teeth 162*a* of the other speed change gear 162 and that the gear-engaging operation has finished. The control means 100, then, proceeds to step S22 to de-energize (turn off) the pair of coils 55 (MC3) and 56 (MC4) of the shift actuator 5. The control means 100, then, proceeds to step S15 to connect the wet-type multi-plate clutch 13 (CLT).

In the above-mentioned embodiment, as described above, the electric power supplied to the pair of coils 55 (MC3) and 56 (MC4) of the shift actuator 5 is controlled in response to the shift stroke position P detected by the shift stroke sensor 9 (SIS). Therefore, the thrust which is required neither too much nor too less can be produced at each of the shift stroke positions making it possible to execute the shifting operation with the highest energy efficiency. In the above-mentioned embodiment, further, when the shift stroke position P exceeds the position P2*a* or P12*a* (where the engagement between the chamfer of the clutch sleeve and the chamfer of the dog teeth ends) where the rear end of the chamfer of the spline 151 of the clutch sleeve 15 arrives at the rear end of the chamfer of the dog teeth, the voltage applied to the pair of coils 55 (MC3) and 56 (MC4) is gradually lowered up to the shift stroke end P1 or P13, making it possible to prevent the occurrence of shock at the shift stroke end when the gear is to be engaged.

Next, a further embodiment of the shifting device for a transmission will be described with reference to FIGS. 12 to 16.

Figure 12:
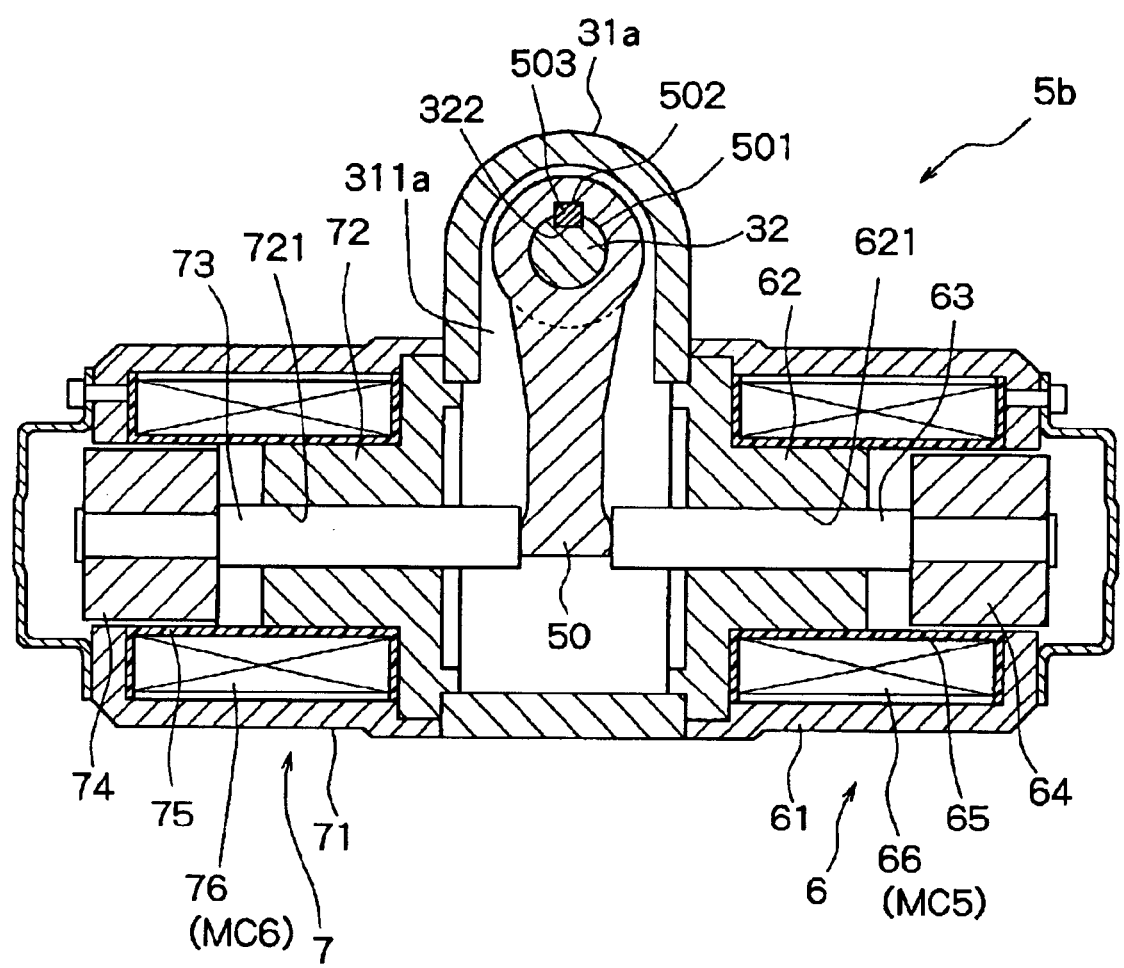
FIG. 12 is a sectional view illustrating the third embodiment of the shift actuator.

FIG. 12 is a sectional view of the shift actuator according to the third embodiment that corresponds to the sectional view along the line B—B of FIG. 2.

The shift actuator 5*b* of the embodiment shown in FIG. 12 includes the first electromagnetic solenoid 6 and the second electromagnetic solenoid 7 for operating, in the directions opposite to each other, the operation lever 50 mounted on the control shaft 32 arranged within the casings 31a, 31b and 31c of the select actuator 3. The operation lever 50 has a hole 501 formed in the base portion thereof so as to be fitted to the control shaft 32, and turns integratedly with the control shaft 32 by fitting a key 503 into a key way 502 formed in the inner peripheral surface of the hole 501 and into a key way 322 formed in the outer peripheral surface of the control shaft 32. The operation lever 50 works as an operation member coupled to the shift lever 34 via the control shaft 32 and the shift sleeve 35, and is arranged passing through the opening 311a formed in the lower portion of the left casing 31a in FIGS. 2 and 3.

Next, the first electromagnetic solenoid 6 will be described.

The first electromagnetic solenoid 6 comprises a casing 61, a fixed iron core 62 made of a magnetic material arranged in the casing 61, an operation rod 63 made of a nonmagnetic material such as a stainless steel or the like arranged passing through an insertion hole 621 formed in the central portion of the fixed iron core 62, a moving iron core 64 that is made of a magnetic material mounted on the operation rod 63 and is allowed to be brought into contact with, and to be separated away from, the fixed iron core 62, and an electromagnetic coil 66 (MC5) wound on a bobbin 65 that is made of a nonmagnetic material such as a synthetic resin or the like and is arranged between the casing 61 and the moving iron core 64 as well as the fixed iron core 62. When an electric current is fed to the electromagnetic coil 66 (MC5) of the thus constituted first electromagnetic solenoid 6, the moving iron core 64 is attracted by the fixed iron core 62. As a result, a plunger 63 mounting the moving iron core 64 moves toward the left in FIG. 12, and the end thereof acts on the operation lever 50 which, then, turns clockwise on the control shaft 32. Therefore, the shift lever 34 integratedly constituted with the shift sleeve 35 mounted on the control shaft 32 is shifted in one direction.

Next, the second electromagnetic solenoid 7 will be described.

The second electromagnetic solenoid 7 is arranged being opposed to the first electromagnetic solenoid 6. Like the first electromagnetic solenoid 6, the second electromagnetic solenoid 7, too, comprises a casing 71, a fixed iron core 72 made of a magnetic material arranged in the casing 71, an operation rod 73 made of a nonmagnetic material such as a stainless steel or the like arranged passing through an insertion hole 721 formed in the central portion of the fixed iron core 72, a moving iron core 74 that is made of a magnetic material mounted on the operation rod 73 and is allowed to be brought into contact with, and to be separated away from, the fixed iron core 72, and an electromagnetic coil 76 (MC6) wound on a bobbin 75 that is made of a nonmagnetic material such as a synthetic resin or the like and is arranged between the casing 71 and the moving iron core 74 as well as the fixed iron core 72. When an electric current is fed to the electromagnetic coil 76 (MC6) of the thus constituted second electromagnetic solenoid 7, the moving iron core 74 is attracted by the fixed iron core 72. As a result, the operation rod 73 mounting the moving iron core 74 moves toward the right in FIG. 12, and the end thereof acts on the operation lever 50 which, then, turns counterclockwise on the control shaft 32. Therefore, the shift lever 34 integratedly constituted with the shift sleeve 35 mounted on the control shaft 32 is shifted in the other direction.

Figure 13:
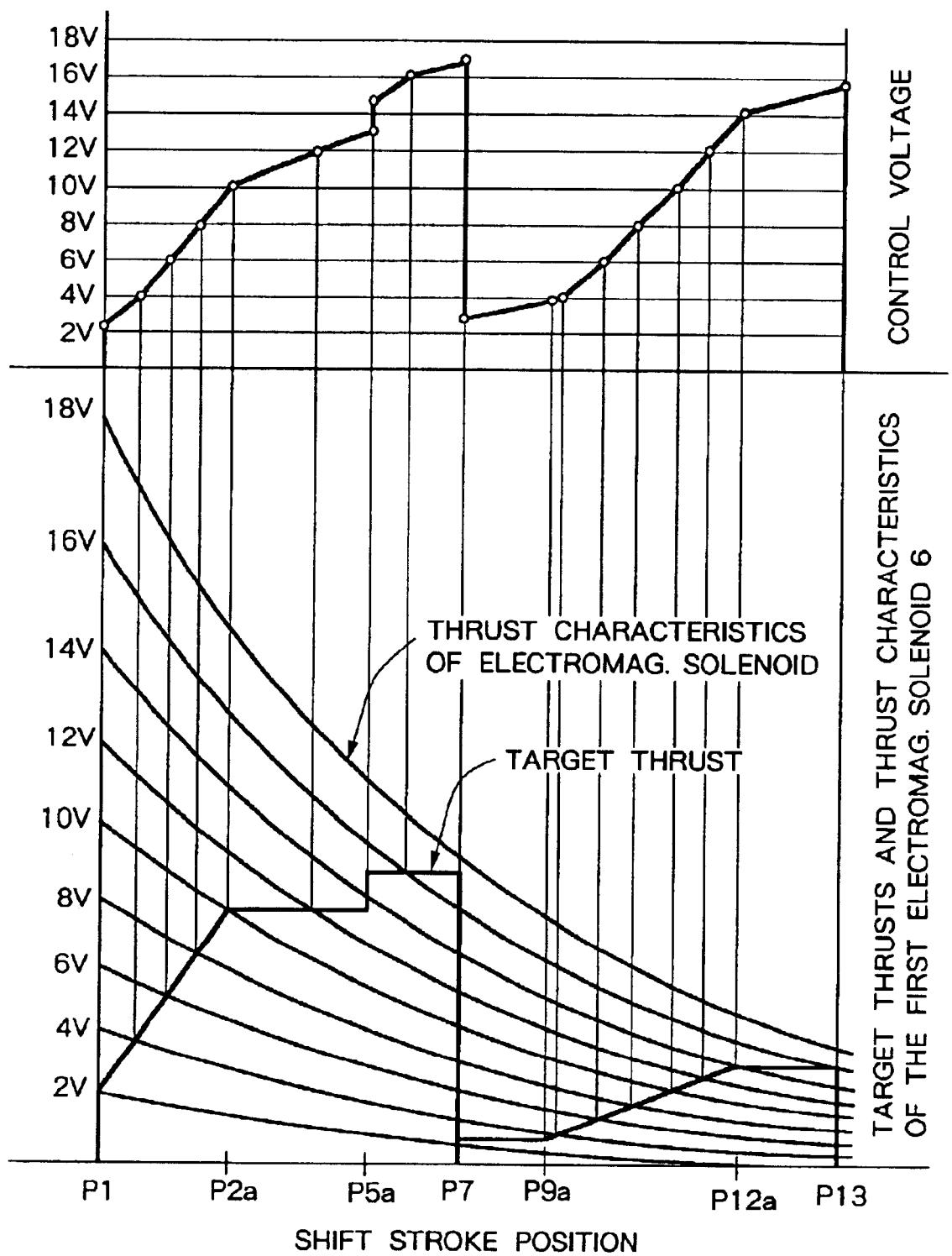
FIG. 13 is a control map illustrating relationships between the target thrusts corresponding to the shift stroke positions of the first electromagnetic solenoid constituting the shift actuator shown in FIG. 2 and the control voltages necessary for obtaining the target thrusts.
Figure 14:
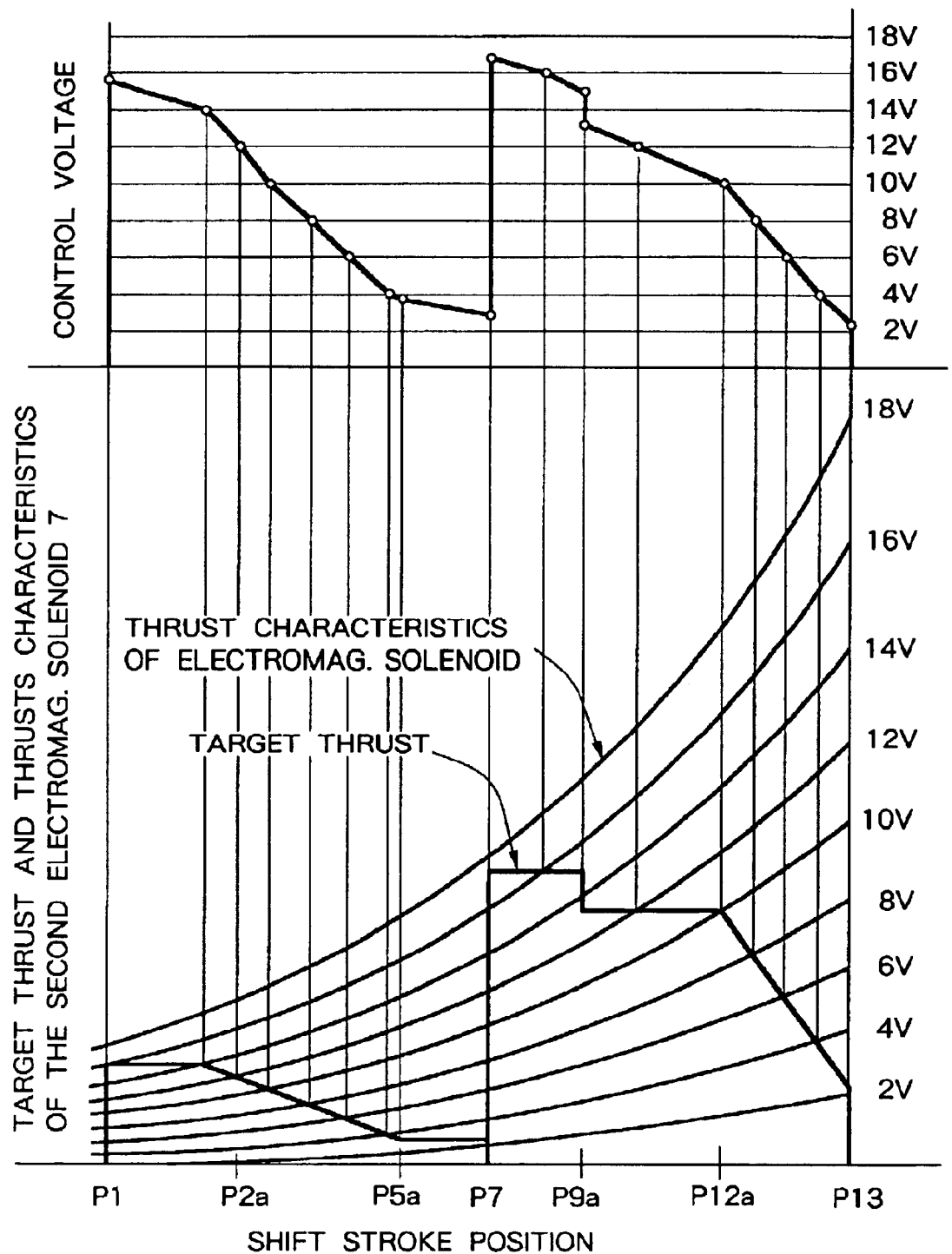
FIG. 14 is a control map illustrating relationships between the target thrusts corresponding to the shift stroke positions of the second electromagnetic solenoid constituting the shift actuator shown in FIG. 2 and the control voltages necessary for obtaining the target thrusts.

FIGS. 13 and 14 are control maps illustrating relationships between the target thrusts corresponding to the shift stroke positions of the first electromagnetic solenoid 6 and of the second electromagnetic solenoid 7 constituting the shift actuator 5b shown in FIG. 12 and the control voltages necessary for obtaining the target thrusts. The shift stroke positions in FIGS. 13 and 14 correspond to those of FIG. 9, and main shift stroke positions only are illustrated. In the shift actuators 5 and 5a shown in FIGS. 5 and 7 described above, the voltage to be applied may be controlled in proportion to the target thrust since the thrust does not change at each of the operation positions. In the electromagnetic solenoid, however, the thrust greatly changes depending upon the gap between the fixed iron core and the operation position or the moving iron core. That is, in the first electromagnetic solenoid 6, the gap between the moving iron core 64 and the fixed iron core 62 becomes the largest at the shift stroke position P13 and becomes the smallest at the shift stroke position P1. Therefore, the thrust characteristics for the voltage applied to the electromagnetic coil 66 (MC5) vary from the shift stroke position P13 toward the shift stroke position P1 respectively describing a curve of secondary degree as shown in FIG. 13. Further, in the second electromagnetic solenoid 7, the gap between the moving iron core 74 and the fixed iron core 72 becomes the largest at the shift stroke position P1 and becomes the smallest at the shift stroke position P13. Therefore, the thrust characteristics for the voltage applied to the electromagnetic coil 76 (MC6) vary from the shift stroke position P1 toward the shift stroke position P13 respectively describing a curve of secondary degree as shown in FIG. 14. To obtain a target thrust corresponding to the shift stroke position in the shift actuator using the electromagnetic solenoid, therefore, the control voltage applied to the electromagnetic coil must be set based on the target thrust corresponding to the shift stroke position and on the gap between the fixed iron core and the moving iron core corresponding to the shift stroke position. It is, therefore, desired that the control voltages applied to the electromagnetic coil 66 (MC5) and to the electromagnetic coil 76 (MC6) be set to values shown in FIGS. 13 and 14. Control maps of voltages to be applied to the electromagnetic coil 66 (MC5) and to the electromagnetic coil 76 (MC6) shown in FIGS. 13 and 14 have been stored in the read-only memory (ROM) 102 in the control means 100.

Figure 15:
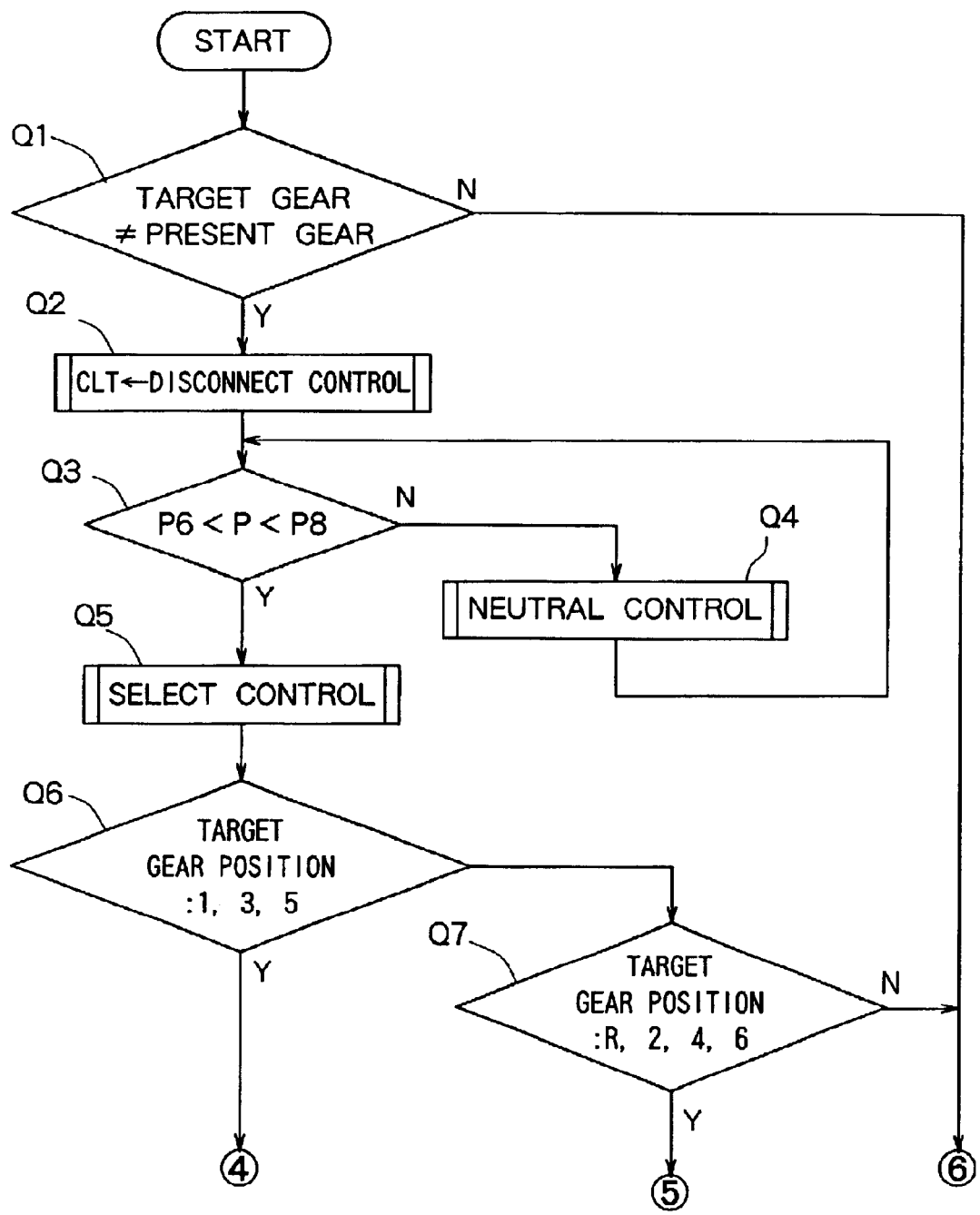
FIG. 15 is part of a flowchart illustrating another embodiment of the procedure for operating a control means that constitutes the shifting device for the transmission according to the present invention.
Figure 16:
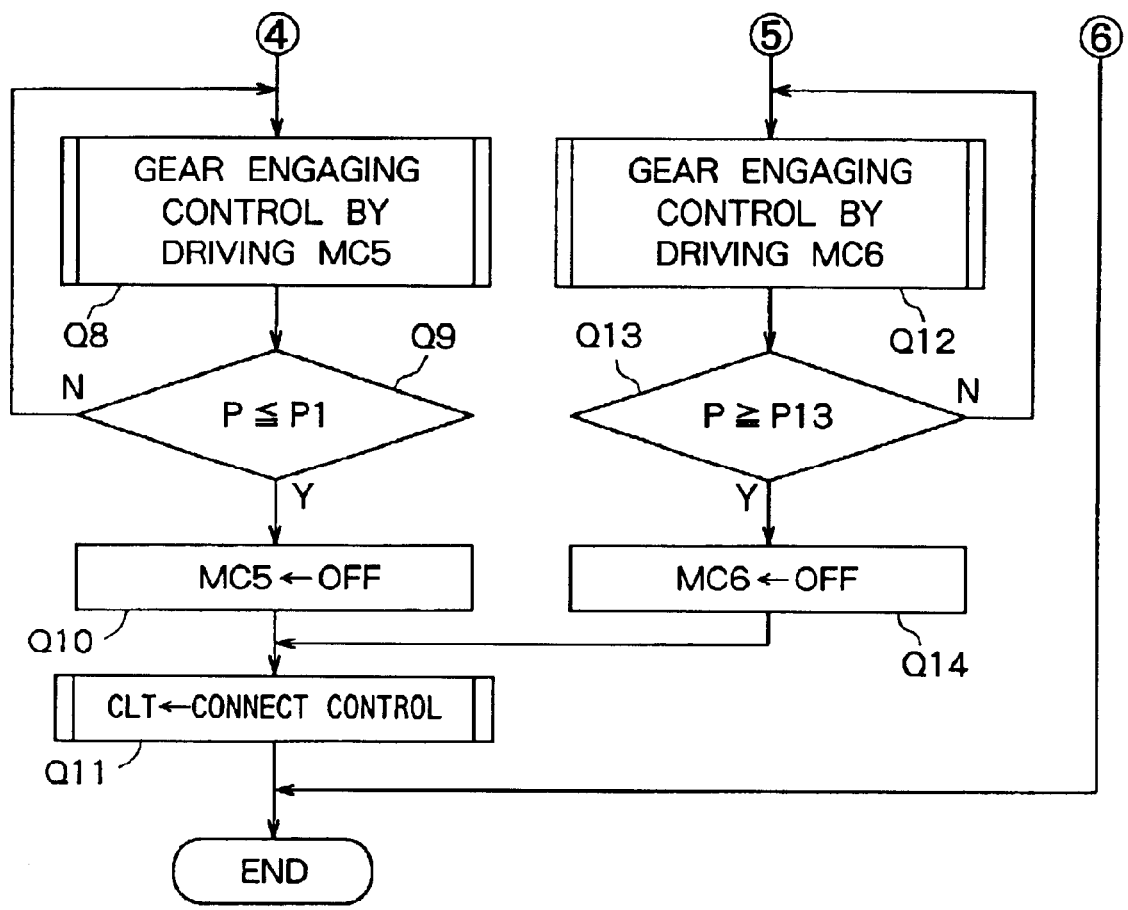
FIG. 16 is another part of the flowchart illustrating another embodiment of the procedure for operating a control means that constitutes the shifting device for the transmission according to the present invention.

Next, the shift control operation by using the shift actuator 5b of the embodiment shown in FIG. 12 will be described with reference to a flowchart shown in FIGS. 15 and 16.

Figure 10:
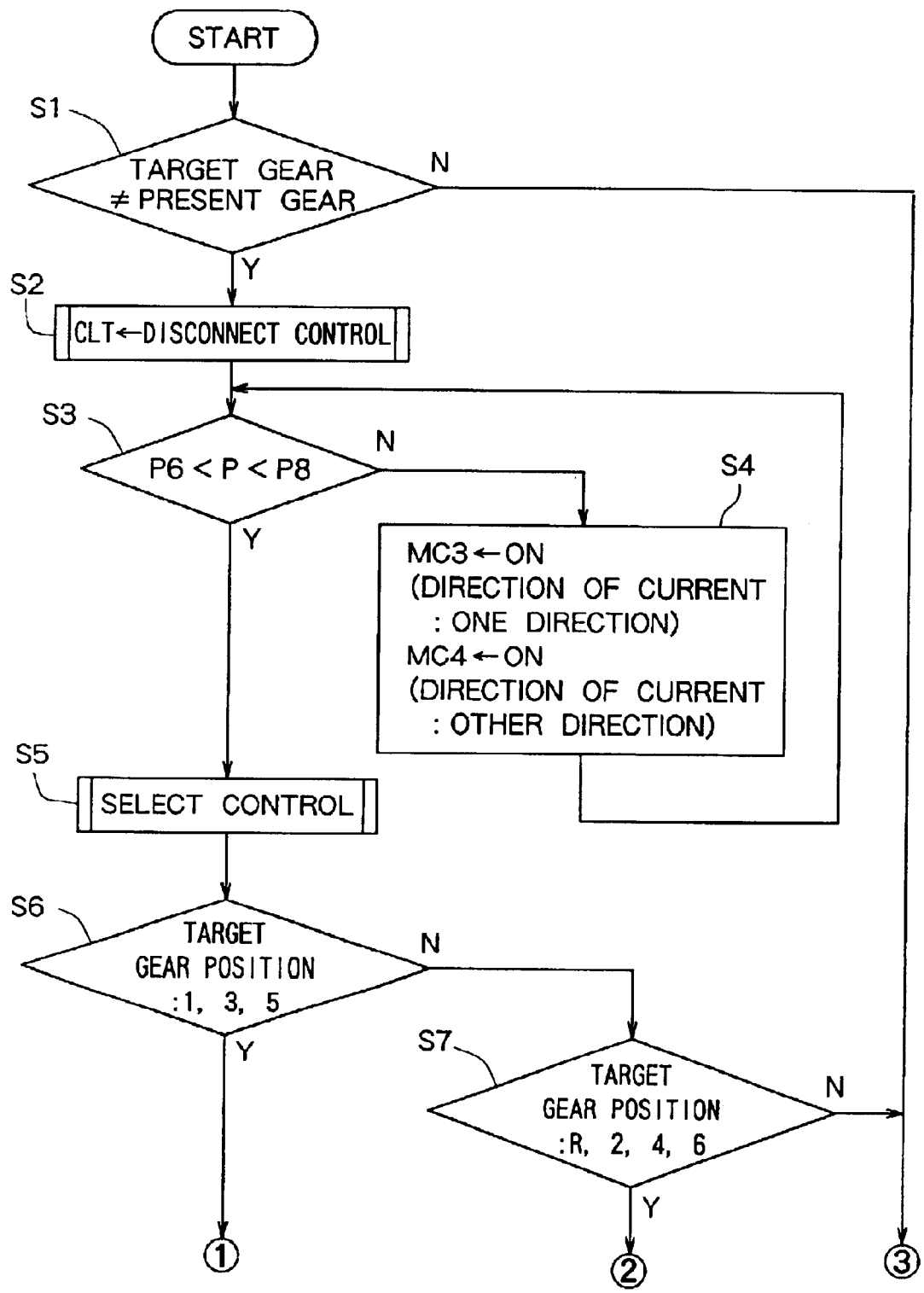
FIG. 10 is part of a flowchart illustrating an embodiment of a procedure for operating a control means that constitutes the shifting device for the transmission according to the present invention.
Figure 11:
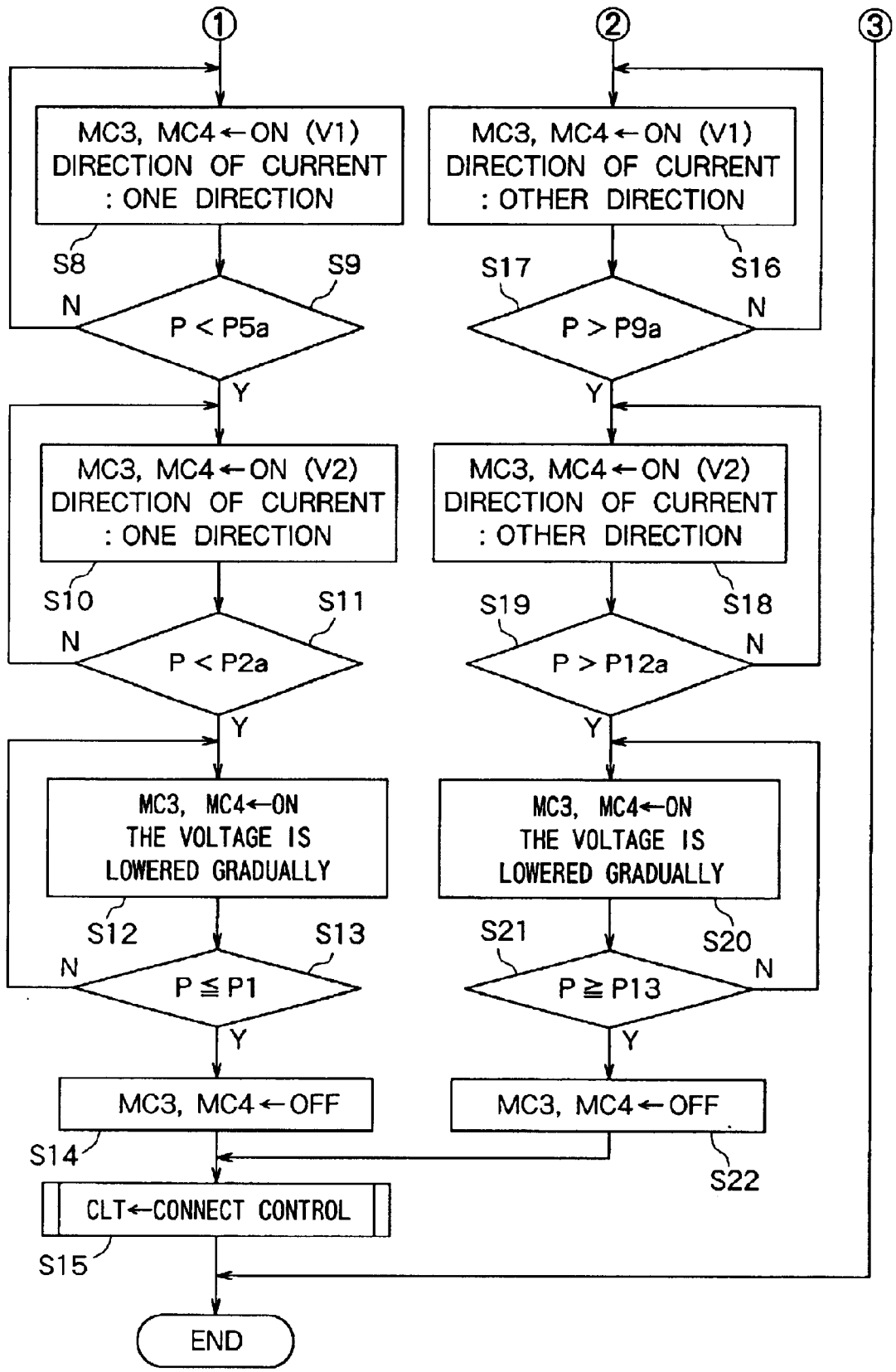
FIG. 11 is another part of the flowchart illustrating the embodiment of the procedure for operating a control means that constitutes the shifting device for the transmission according to the present invention.

Steps Q1 to Q3 are the same as steps S1 to S3 in the flowchart of FIG. 10, and are not described here. After having executed steps Q1 through Q3, when the shift stroke position P is not in the neutral range (P6<P<P8) at step Q3, the control means 100 proceeds to step Q4 to execute the neutral control operation. That is, when the present shift stroke position P is on the P13 side beyond the neutral range (P6<P<P8), the electromagnetic coil 66 (MC5) of the first electromagnetic solenoid 6 is driven (turned on). When the present shift stroke position P is on the P1 side beyond the neutral range (P6<P<P8), the electromagnetic coil 76 (MC6) of the second electromagnetic solenoid 7 is driven (turned on). At this moment, voltages applied to the electromagnetic coil 66 (MC5) of the first electromagnetic solenoid 6 and to the electromagnetic coil 76 (MC6) of the second electromagnetic solenoid 7 are the control voltages set correspondingly to the shift stroke positions P shown in FIGS. 13 and 14. Thus, after the shift stroke position P has arrived at the neutral range (P6<P<P8), either the electromagnetic coil 66 (MC5) or the electromagnetic coil 76 (MC6) is deenergized (turned off) to effect the neutral control operation.

After the neutral control operation is effected at step Q4, the control means 100 returns back to step Q3 to check whether the shift stroke position P is lying in the neutral range (P6<P<P8). When the shift stroke position P has not yet arrived at the neutral range (P6<P<P8), the processing of steps Q3 and Q4 are repeated.

When the shift stroke position P is lying in the neutral range (P6<P<P8) at step Q3, the control means 100 proceeds to step Q5 to execute the select control operation. The select control operation is the same as that of step S5 in the flowchart of FIG. 10, and is not described here again.

When the select control operation is effected at step Q5, the control means 100 proceeds to step Q6 to check whether the target gear position instructed by the target gear position instruction means 113 (GCS) is any one of the first gear, third gear or fifth gear. When the target gear position is not any one of the first gear position, third gear position or fifth gear position, the control means 100 proceeds to step S7 to check whether the target gear position instructed by the target gear position instruction means 113 (GCS) is any one of the reverse gear position (R), second gear position, fourth gear position or sixth gear position. When the target gear position is not any one of the reverse gear position (R), second gear position, fourth gear position or sixth gear position, the control means 100 judges that the target gear position is neutral and that there is no need of changing the gear. The routine therefore ends.

When it is judged at step Q6 that the target gear position is any one of the first gear position, third gear position or fifth gear position, the control means 100 proceeds to step Q8 where the electromagnetic coil 66 (MC5) of the first electromagnetic solenoid 6 constituting the shift actuator 5b is energized to execute the gear-engaging control operation. At this moment, the voltage applied to the electromagnetic coil 66 (MC5) of the first electromagnetic solenoid 6 is a control voltage set correspondingly to the shift stroke position P shown in FIG. 13.

Next, the control means 100 proceeds to step Q9 to check whether the shift stroke position P has arrived at the shift stroke end P1. When the shift stroke position P does not arrive at the shift stroke end P1, the control means 100 repeats the processings of steps Q8 and Q9. When the shift stroke position P has arrived at the shift stroke end P1 at step Q9, the control means 100 so judges that the gear-engaging operation has finished, and proceeds to step Q10 to de-energize (turn off) the electromagnetic coil 66 (MC5) of the first electromagnetic solenoid 6. The control means 100, then, proceeds to step Q11 to connect the wet-type multi-plate clutch 13 (CLT).

Described below is a case where the target gear position instructed by the target gear position instruction means 113 (GCS) at step Q7 is any one of the reverse gear position (R), second gear position, fourth gear position or sixth gear position.

When it is judged at step Q7 that the target gear position is any one of the reverse gear position (R), second gear position, fourth gear position or sixth gear position, the control means 100 proceeds to step Q12 where the electromagnetic coil 76 (MC6) of the second electromagnetic solenoid 7 constituting the shift actuator 5b is driven to effect the gear-engaging control operation. At this moment, the voltage applied to the electromagnetic coil 76 (MC6) of the second electromagnetic solenoid 7 is a control voltage set correspondingly to the shift stroke position P shown in FIG. 14.

Next, the control means 100 proceeds to step Q13 to check whether the shift stroke position P has arrived at the shift stroke end P13. When the shift stroke position P does not arrive at the shift stroke end P13, the control means 100 repeats the processings of steps Q12 and Q13. When the shift stroke position P has arrived at the shift stroke end P13 at step Q13, the control means 100 so judges that the gear-engaging operation has finished, and proceeds to step Q14 to de-energize (turn off) the electromagnetic coil 76 (MC6) of the second electromagnetic solenoid 7. The control means 100, then, proceeds to step Q11 to connect the wet-type multi-plate clutch 13 (CLT).

Being constituted as described above, the shifting device for a transmission according to the present invention exhibits action and effect as described below.

That is, according to the present invention, the electric power fed to the shift actuator is controlled in response to the shift stroke position detected by the shift stroke sensor. Therefore, a thrust which is required neither too much nor too less can be produced at each of the shift stroke positions, and the shifting operation is executed with the highest energy efficiency.

I claim:

1. A shifting device for operating a shift lever of a transmission, equipped with a synchronizing mechanism, in the direction of shift to bring the gears of the transmission into engagement or disengagement, said shifting device comprising:

a shift actuator including an operation member coupled to the shift lever, an operation rod engaged with said operation member, a magnetic moving member on the outer peripheral surface of said operation rod, a cylindrical fixed yoke encircling said magnetic moving member, and a pair of coils arranged side by side in the axial direction inside said fixed yoke;

a shift stroke sensor for detecting the shift stroke position of the shift lever; and control means for controlling electric power supplied to said pair of coils of said shift actuator based on a signal from said shift stroke sensor; wherein said control means controls the electric power supplied to said pair of coils of said shift actuator in response to the shift stroke position detected by said shift stroke sensor.

2. A shifting device for a transmission according to claim 1, wherein said control means, in the gear-engaging operation, sets the electric power supplied to said pair of coils to a first electric power up to a position where the synchronism of said synchronizing mechanism ends, sets the electric power to a second electric power, smaller than the first electric power, after the synchronism end position is passed until a position where the engagement between a chamfer of a clutch sleeve of the synchronizing mechanism and a chamfer of dog teeth of a gear ends.

3. A shifting device for a transmission according to claim 2, wherein said control means, in the gear-disengaging operation, sets the electric power fed to said pair of coils to a third electric power, smaller than the second electric power, over a range in which the clutch sleeve of said synchronizing mechanism is in mesh with the dog teeth.

4. A shifting device for operating a shift lever of a transmission equipped with a synchronizing mechanism in the direction of shift, comprising:

an operation member coupled to the shift lever;

a shift actuator including a first electromagnetic solenoid and a second electromagnetic solenoid for operating said operation member in directions opposite to each other;

a shift stroke sensor for detecting the shift stroke position of the shift lever; and control means for controlling electric power fed to said first electromagnetic solenoid and to said second electromagnetic solenoid of said shift actuator based on a signal from said shift stroke sensor; wherein:

said control means controls the electric power supplied to said first electromagnetic solenoid and to said second electromagnetic solenoid of said shift actuator in response to the shift stroke position detected by said shift stroke sensor, and the electric power fed to said first electromagnetic solenoid and to said second electromagnetic solenoid is set based on a target thrust corresponding to the shift stroke position and on a gap between a moving iron core and a fixed iron core of the first electromagnetic solenoid of the second electromagnetic solenoid corresponding to the shift stroke position.

* * * * *